US008014289B2

(12) United States Patent
Noble

(10) Patent No.: US 8,014,289 B2
(45) Date of Patent: Sep. 6, 2011

(54) METHOD AND APPARATUS FOR NON CONTIGUOUS SLIDING WINDOW

(75) Inventor: Seth Bradley Noble, Norman, OK (US)

(73) Assignee: Data Expedition, Inc., Norman, OK (US)

( * ) Notice: Subject to any disclaimer, the term of this patent is extended or adjusted under 35 U.S.C. 154(b) by 0 days.

(21) Appl. No.: 12/633,684

(22) Filed: Dec. 8, 2009

(65) Prior Publication Data

US 2010/0085877 A1 Apr. 8, 2010

Related U.S. Application Data

(63) Continuation of application No. 11/543,581, filed on Oct. 3, 2006, now Pat. No. 7,630,315, which is a continuation of application No. 09/677,040, filed on Sep. 29, 2000, now Pat. No. 7,158,479.

(60) Provisional application No. 60/157,221, filed on Sep. 30, 1999.

(51) Int. Cl.
*H04L 12/26* (2006.01)
(52) U.S. Cl. ........................ 370/236; 370/394
(58) Field of Classification Search ................ 370/235, 370/236, 229, 389, 392, 394, 465, 468, 471, 370/474; 709/203, 208
See application file for complete search history.

(56) References Cited

U.S. PATENT DOCUMENTS

| | | |
|---|---|---|
| 5,197,127 A | 3/1993 | Waclawsky et al. |
| 5,566,176 A | 10/1996 | Chang |
| 5,727,002 A | 3/1998 | Miller et al. |
| 5,799,002 A | 8/1998 | Krishnan |
| 5,845,280 A | 12/1998 | Treadwell, III et al. |
| 5,878,228 A | 3/1999 | Miller et al. |
| 5,925,105 A | 7/1999 | Hales et al. |
| 5,926,330 A | 7/1999 | Ichinokawa |
| 5,928,330 A | 7/1999 | Goetz et al. |
| 5,935,105 A | 8/1999 | Manning et al. |
| 5,941,951 A | 8/1999 | Day et al. |
| 5,953,506 A | 9/1999 | Kalra et al. |
| 6,018,619 A | 1/2000 | Allard et al. |
| 6,018,780 A | 1/2000 | Frenchel |
| 6,061,733 A | 5/2000 | Bodin et al. |
| 6,085,241 A | 7/2000 | Otis |
| 6,105,029 A | 8/2000 | Maddalozzo, Jr. et al. |
| 6,161,141 A * | 12/2000 | Dillon ........................ 709/230 |
| 6,205,120 B1 | 3/2001 | Packer et al. |
| 6,279,040 B1 | 8/2001 | Ma et al. |
| 6,324,582 B1 | 11/2001 | Sridhar et al. |
| 6,389,016 B1 | 5/2002 | Sabaa et al. |
| 6,430,620 B1 | 8/2002 | Omura et al. |
| 6,434,147 B1 | 8/2002 | Brown et al. |

(Continued)

OTHER PUBLICATIONS

Martin F. Arlitt and Carey L. Williamson, "Internet Web Servers: Workload Characterization and Performance Implications," IEEE Transactions on Networking, vol. 5, No. 5, Oct. 1997.

(Continued)

*Primary Examiner* — Brian D Nguyen
(74) *Attorney, Agent, or Firm* — Blakely Sokoloff Taylor & Zafman LLP

(57) ABSTRACT

A method that limits data flow between two network nodes to an amount within a window where a first portion of data within a first segment of the window is separated from a second portion of data within a second segment of the window by a third portion of data not within the window.

18 Claims, 15 Drawing Sheets

U.S. PATENT DOCUMENTS

| | | | |
|---|---|---|---|
| 6,445,717 B1* | 9/2002 | Gibson et al. | 370/473 |
| 6,449,631 B1 | 9/2002 | Takamoto et al. | |
| 6,460,087 B1 | 10/2002 | Saito et al. | |
| 6,470,378 B1 | 10/2002 | Tracton et al. | |
| 6,473,425 B1 | 10/2002 | Bellaton et al. | |
| 6,473,793 B1 | 10/2002 | Dillon et al. | |
| 6,490,627 B1 | 12/2002 | Kalra et al. | |
| 6,493,316 B1 | 12/2002 | Chapman et al. | |
| 6,594,699 B1 | 7/2003 | Sahai et al. | |
| 6,621,796 B1* | 9/2003 | Miklos | 370/236 |
| 6,687,753 B2 | 2/2004 | Schneider | |
| 6,725,249 B2 | 4/2004 | Sidi et al. | |
| 6,745,229 B1 | 6/2004 | Gobin et al. | |
| 6,757,255 B1 | 6/2004 | Aoki et al. | |
| 6,763,392 B1 | 7/2004 | del Val et al. | |
| 6,768,392 B2 | 7/2004 | Makino et al. | |
| 6,788,704 B1* | 9/2004 | Lindsay | 370/465 |
| 7,085,273 B1* | 8/2006 | Chuah | 370/394 |
| 2003/0140159 A1 | 7/2003 | Campbell et al. | |

OTHER PUBLICATIONS

R. Braden, "T/TCP—TCP Extensions for Transactions" RFC 1644, Jul. 1994.

E.G. Britton, J. Tavs and R. Bournas, "TCP/IP: The next generation," IBM Systems Journal, vol. 34, No. 3, pp. 452-471, 1995.

V. Cerf and R. Kahn, "A Protocol for Packet Network Intercommunication", IEEE Transactions on Communications, vol. COM-22, No. 5, pp. 637-648, May 1974.

D.D. Clark and D.L. Tennenhouse, "Architectural considerations for a new generation of protocols," in SIGCOMM Symposium on Communications Architectures on Protocols, (Philadelphia, Pennsylvania), pp. 200-208, IEEE Computer Communications Review, vol. 20 (4), Sep. 1990.

S. Floyd and K. Fall, "Promoting the Use of End-to-End Congestion Control in the Internet"; IEEE/ACM Transactions on Networking, Aug. 1999.

John Heidemann, Katia Obraczka and Joe Touch, "Modeling the Peformance of HTTP Over Several Transport Protocols," IEEE/ACM Transactions on Networking, vol. 5, No. 5, Oct. 1997.

B. Leiner, V. Cerf, D. Clark, R. Kahn, L. Kleinrock, D. Lynch, J. Postel, L. Roberts, S. Wolff, "The Past and Future History of the Internet", Communications of the ACM, vol. 40, No. 2, pp. 102-108, Feb. 1997.

J. Postel (ed.), "User Datagram Protocol" RFC 768, Aug. 1980.

J. Postel (ed.), "Transmission Control Protocol" RFC 793, Sep. 1981.

H. Schulzinne, S. Casner, R. Frederick and V. Jacobson, "RTP: A Transport Protocol for Real-Time Applications," RFC 1889, Network Working Group, Jan. 1996.

Mike Chen and Rajarshi Gupta, "WebTP: A Receiver-Driven Web Transport Protocol," CS268, University of California at Berkeley.

Sally Floyd, Debroah Estrin, Greg Marshall, Vern Paxson, Lixia Zhang and others, "Internet Research: Comments on Formulating the Problem," Jan. 21, 1998.

D. D. Clark, M. Lambert, L. Zhang, "NETBLT: A Bulk Data Transfer Protocol" RFC 969, Dec. 1985, pp. 1-15.

Tannenbaum, A., "Computer Networks", Third Edition, 1996 Prentice Hall, pp. 28-38, ISBN 0-13-349945-6.

L. Zhang, D.Clark, "Oscillating Behavior of Network Traffic: A Case Study Simulation", Internetworking: Research and Experience, vol. 1, pp. 101-112, 1990.

* cited by examiner

METHOD AND APPARATUS FOR NON CONTIGUOUS SLIDING WINDOW

CLAIM TO PRIORITY

This application is a continuation of U.S. application Ser. No. 11/543,581 filed Oct. 3, 2006, now U.S. Pat. No. 7,630,315, which claims priority to and is a continuation of U.S. application Ser. No. 09/677,040, filed Sep. 29, 2000, now U.S. Pat. No. 7,158,479 which claims the benefit of provisional Application No. 60/157,221, filed Sep. 30, 1999.

CROSS REFERENCE TO RELATED APPLICATIONS

Cross-reference is made to the following related patent applications, which is assigned to the same assignee as the present application: U.S. patent application Ser. No. 09/675,982 filed Sep. 29, 2000, entitled, Method and Apparatus For Client Side State Management, by Seth Bradley Noble and U.S. patent application Ser. No. 09/676,016 filed Sep. 29, 2000, entitled, Flow Control Method and Apparatus, by Seth Bradley Noble.

FIELD OF THE INVENTION

The field of invention relates to networking architecture generally; and more specifically, to the transport layer within a network.

BACKGROUND

FIG. 1 shows a network 104 that communicatively couples two nodes (e.g., a client or server) 101, 102. The nodes typically have an operating system and application software that runs on the operating system. A transport layer is a networking layer located on each of a pair of the network nodes 101, 102 which is responsible for controlling the flow of information between applications located on each node 101, 102. Currently, a transport layer protocol referred to as Transmission Control Protocol (TCP) is widely utilized for communications that transpire over the Internet.

FIG. 2 shows an amount of data 201 that is representative of the amount of data to be passed from one node to another node over a network. The data 201 may be viewed as an addressed block having a starting address 202 and an ending address 203. In order to ensure that the sending node does not "overflow" the network's capacity, TCP regulates the amount of data allowed on the network.

TCP regulates the amount of data allowed on the network at any given time by limiting the range of addresses that correspond to transmitted data. That is, only a contiguous portion 204 (e.g., from a first address 205 up to a second address 206) of the complete amount of data 201 is allowed on the network at any given time.

The range of in transit addresses (e.g., between addresses 205 and 206 inclusive as seen in FIG. 2) is referred to as the a window 204. Under TCP, new data (e.g., located just after address 206) will not be sent onto the network by the sending node until an earliest portion of data within the window (i.e., just after address 205) is acknowledged by the receiving node. As such, data is sent over the network by effectively sliding the entire window 204 forward (i.e., from left to right as seen in FIG. 2) across the entirety of the data 201.

TCP is designed to rapidly increase the flow of data between the sending and receiving nodes until data begins to be lost on the network or a pre-determined flow limit is met. In the former case, TCP lacks sophisticated means for anticipating network congestion or loss. In the later case, the pre-determined limit may be well below the network's capacity. As such, TCP typically presents too much or too little offered load to the network.

Furthermore for either case, should data begin to be lost on the network, TCP "overreacts". Upon loss, it halts all data flow before resuming data flow (possibly including data that was not lost) at a drastically reduced level. As such, the flow TCP offers to the network tends to oscillate between network over utilization and network under utilization. Further still, the oscillation tends to worsen as the number of TCP flows traversing the network increases.

Lastly, for network communications between a client node (also referred to as a client) and a server node (also referred to as a server), TCP tends to place too much processing burden on the server. For example, under TCP the server controls and keeps track of the window size and data addressing discussed above. As a result, if the server has to support a large number of communication session with various clients, the server's resources become strained trying to control each session.

SUMMARY OF INVENTION

A method that limits data flow between two network nodes to an amount within a window where a first portion of data within a first segment of the window is separated from a second portion of data within a second segment of the window by a third portion of data not within the window.

BRIEF DESCRIPTION OF THE DRAWINGS

The present invention is illustrated by way of example, and limitation, in the Figures of the accompanying drawings in which:

FIG. 5b shows a methodology for issuing request messages that may be used by the non contiguous window methodology of FIG. 5a;

DETAILED DESCRIPTION

A method is described that limits data flow between two network nodes to an amount within a window where a first portion of data within a first segment of the window is separated from a second portion of data within a second segment of the window by a third portion of data not within the window.

1.0 Client Side State Management a) Data Model Overview

A computer is any device having one or more processors that execute one or more software programs. A data object (or object) is any digital information resource that may be used by a computer program. Some examples of data objects include a data file, another computer program, an audio/video stream, an audio/video stream source, a software interface (e.g., a control interface and/or a data collection interface) to a remote or local physical device (e.g., a mechanical servo or measurement instrumentality).

An action is any action performed by a computer to or with an object. Some examples of an action include retrieving an object, changing or inquiring or otherwise processing an object's substantive data (such as text data within a word processing file), changing or inquiring or otherwise processing an object's procedural data (such as a "locked" parameter that locks the object's substantive data from being accessed or changed by other programs).

Figure 1:
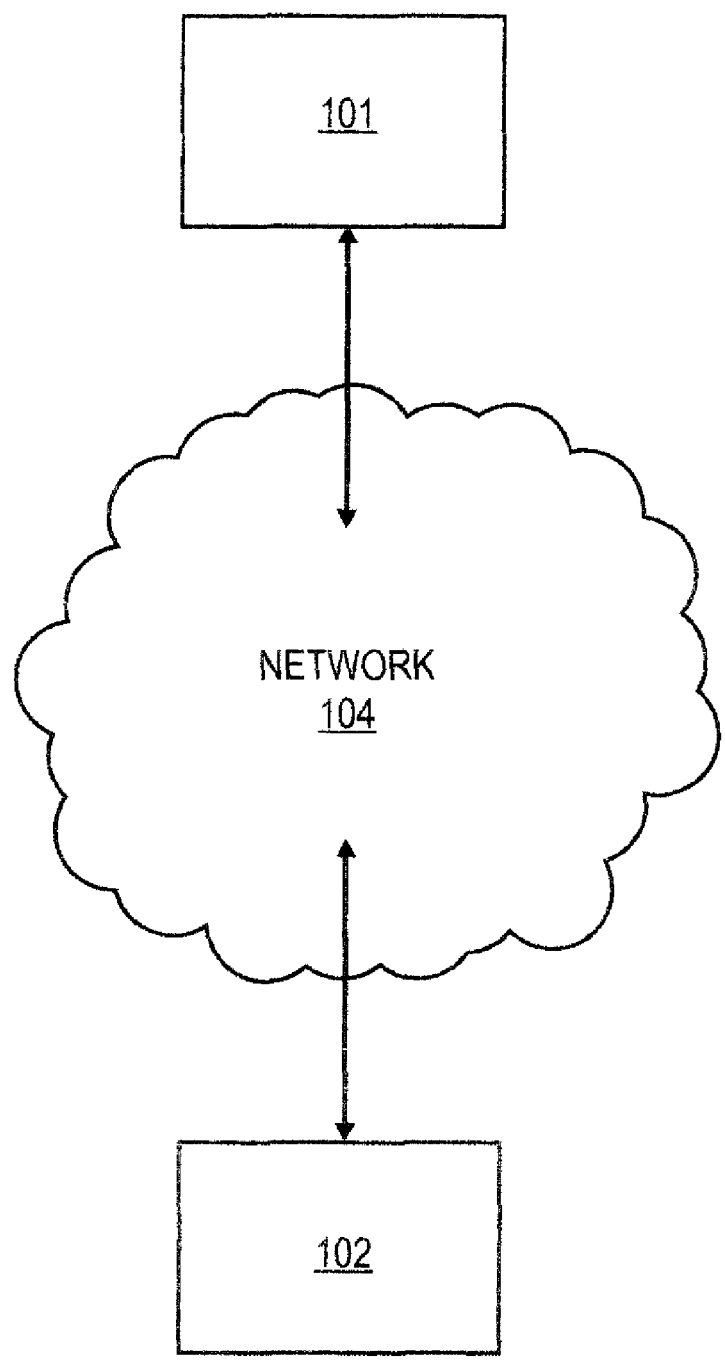
FIG. 1 shows a pair of nodes communicatively coupled through a network.
Figure 2:
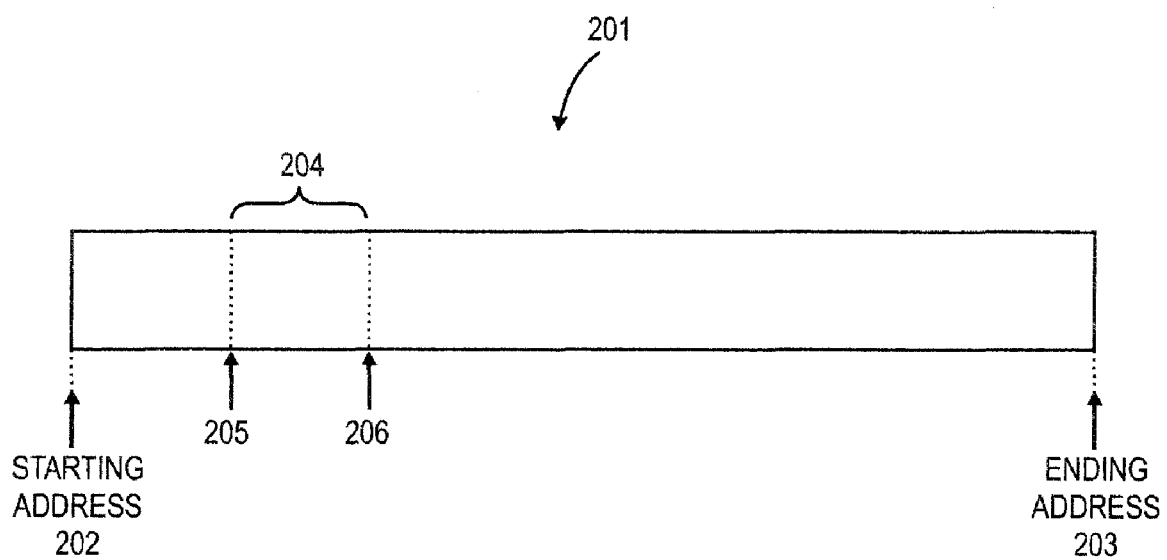
FIG. 2 shows data passed from a sending node to a receiving node.
Figure 3:
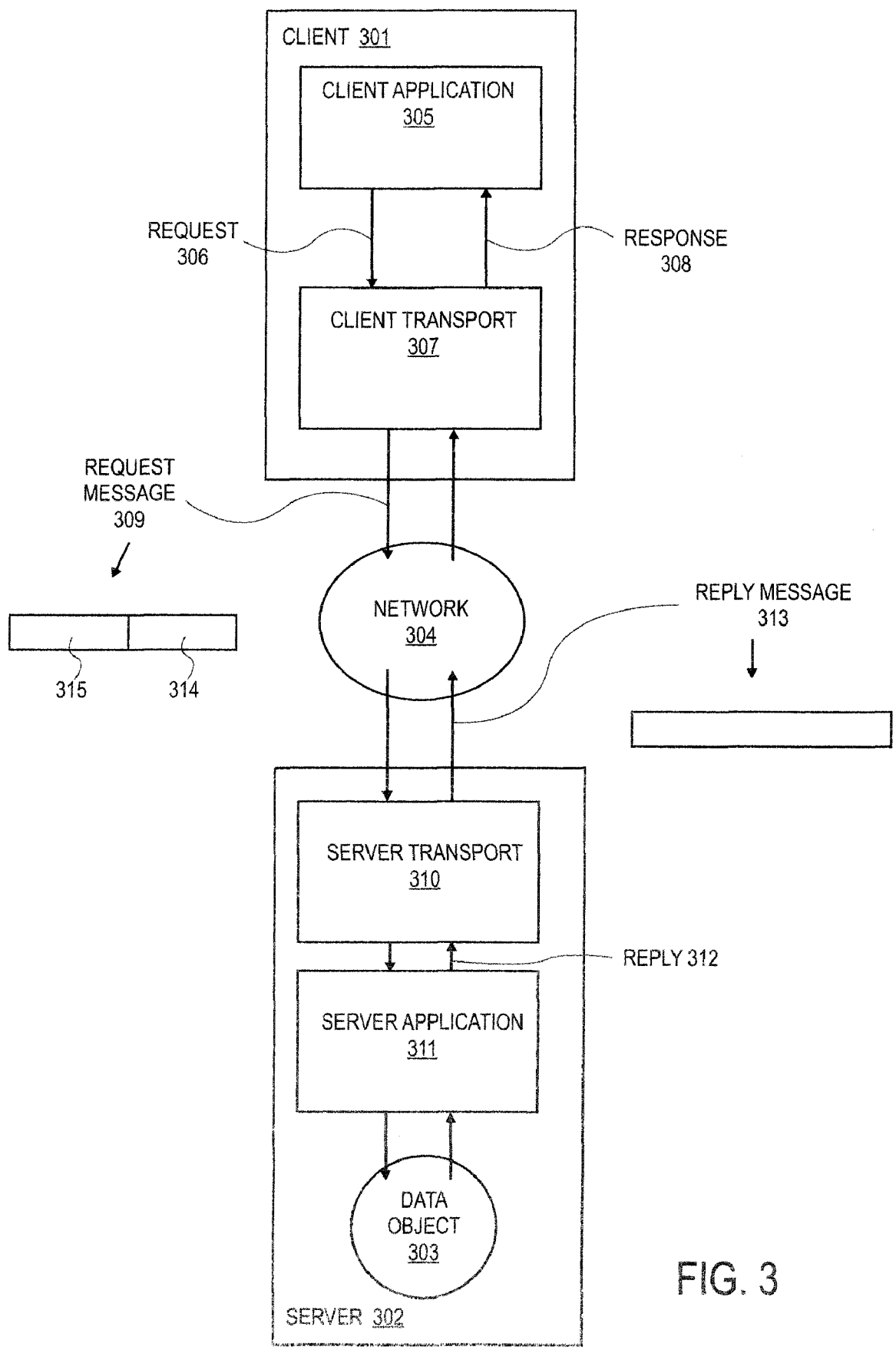
FIG. 3 shows a data flow model that includes client side state management.

Referring to FIG. 3, application software 305 (hereinafter "application") that runs on a first computer (referred to as a client 301) frequently desires to perform an action to or with a data object 303 located on a second computer (referred to as a server 302). The client and server are communicatively coupled via network 304. A client is a network node which generates requests for data or services which are maintained by a server. A server is a network node which receives requests for data or services which it maintains and then sends back replies.

The action may be successfully performed by either: 1) having the client application 305 send a description of the action to the server 302 so that the server 302 can perform an action upon a data object and return the result; or 2) having the client 301 request that the server application 311 retrieve data from the client application 305, perform the action upon that client data using the data object 303, and return the result. In the latter case, each action includes a preliminary action which causes the server 302 to retrieve a possibly large amount of data from the client application 305.

Thus, regardless of how the action is ultimately performed, a description of an action is sent from the client 301 to the server 302. The description of the action as well as a description of the object is embodied in a request 306 sent from the client application 305 to a transport layer 307 that is responsible for controlling the flow of communication between the server 302 and the client 301 over the network 304. Successful completion of the request 306 (e.g., the object sent by the server, the server's indication that an action was performed on the object at the server, etc.) is embodied in the form of a response 308 sent from the transport layer 307 to the client application layer 305.

Thus each request 306 has a corresponding response 308. The sequence of events between the request 306 and the response 308 may be referred to as a transaction. The mechanism of executing a transaction, as described in greater detail below, involves an exchange of messages between the client transport layer 307 and the server transport layer 310 via the network 304, plus various methodologies performed by the respective application and transport layers 305, 307, 310, 311.

Information concerning the state of the transaction is maintained by the client transport layer 307. The state information may include: 1) the client application's request 306; 2) a record of which portions of the response 308 have arrived; 3) statistics about the performance of the network 304; 4) information about the state of the client machine 301; and/or 3) other transaction specific data.

Information concerning the state of the data object 303, including it's properties, resource allocations, access authorization, information about the state of the server machine 302, and other object related data is maintained by the server application 311. As the transaction executes, data is passed between the client transport layer 307, server transport layer 310, and server application 311 to facilitate the maintenance and adjustment of these informations. This division of labor in which the client maintains the transaction state is called "client side state management".

The transport layer 307 at the client, after receiving a request 306 from the client application 305 forwards the description of the action and the object (provided in the request 306) to the server 302 within a network datagram (which may be referred to as a request message 309). In the simplest case, a single request message 309 is sent over the network 304 and received by a corresponding transport layer 310 at the server 302. The description of the object 303 and the action that is embedded within the request message 309 is then forwarded from the server transport layer 310 to a server application 311. The server application 311 performs the action on the object 303 and provides a reply 312.

In the simplest case, the reply 312 includes all the information to be sent to the client application 305 as a result of the request 306 (i.e., all the information needed for the response 306 is embedded in the reply 312). The server transport layer 307 embeds the information found in the reply 312 within a network datagram (referred to as a reply message 313). The reply message 313 is received by the client's transport layer 307. The information to be sent to the client application 305 as a result of its request 306 is then forwarded to the client application 305 via the response 308.

Thus to summarize, the simplest transaction involves one request message 309 and one reply message 313. In many cases, however, the transaction can not be completed with a single request message 309 and a single reply message 313. Because the capacity of the client 301, the server 302 and the network 304 are finite, a plurality of request messages 309 and reply messages 313 may be needed to implement the transaction.

Consider, as just one example, if the server 302 is a large powerful machine and the response 308 to the request 306 is a significant amount of data. If the client 302 and/or the network 304 do not have the capability to receive/transport the response 308 in a single reply message 313, a series of reply messages may be used to send the content of the complete response 308 in a piecemeal fashion.

If more than one reply message is sent, given the applicable capacity limitations, the response 308 is received at the client 301 in a piecemeal fashion. That is the client transport layer 307 continually requests, in the form of a continuous stream of request messages, individual, smaller portions of the response 308. Under typical conditions, a request message 309 that immediately follows a prior request message asks for a "next" portion of the response 308 (i.e., a portion of the response 308 that is logically adjacent to the portion of the response requested by the prior request message).

The server transport layer 310 sends one or more corresponding reply messages for each request message 309 it receives. More than one reply message 313 sent in response to a single request message 309 may be referred to as a "burst" of reply messages. The portion of the response 308 requested by the request message 309 is effectively divided into a collection of smaller portions (i.e., further portions of the response 308) where each smaller portion is carried by its own corresponding reply message 313.

Figure 4:
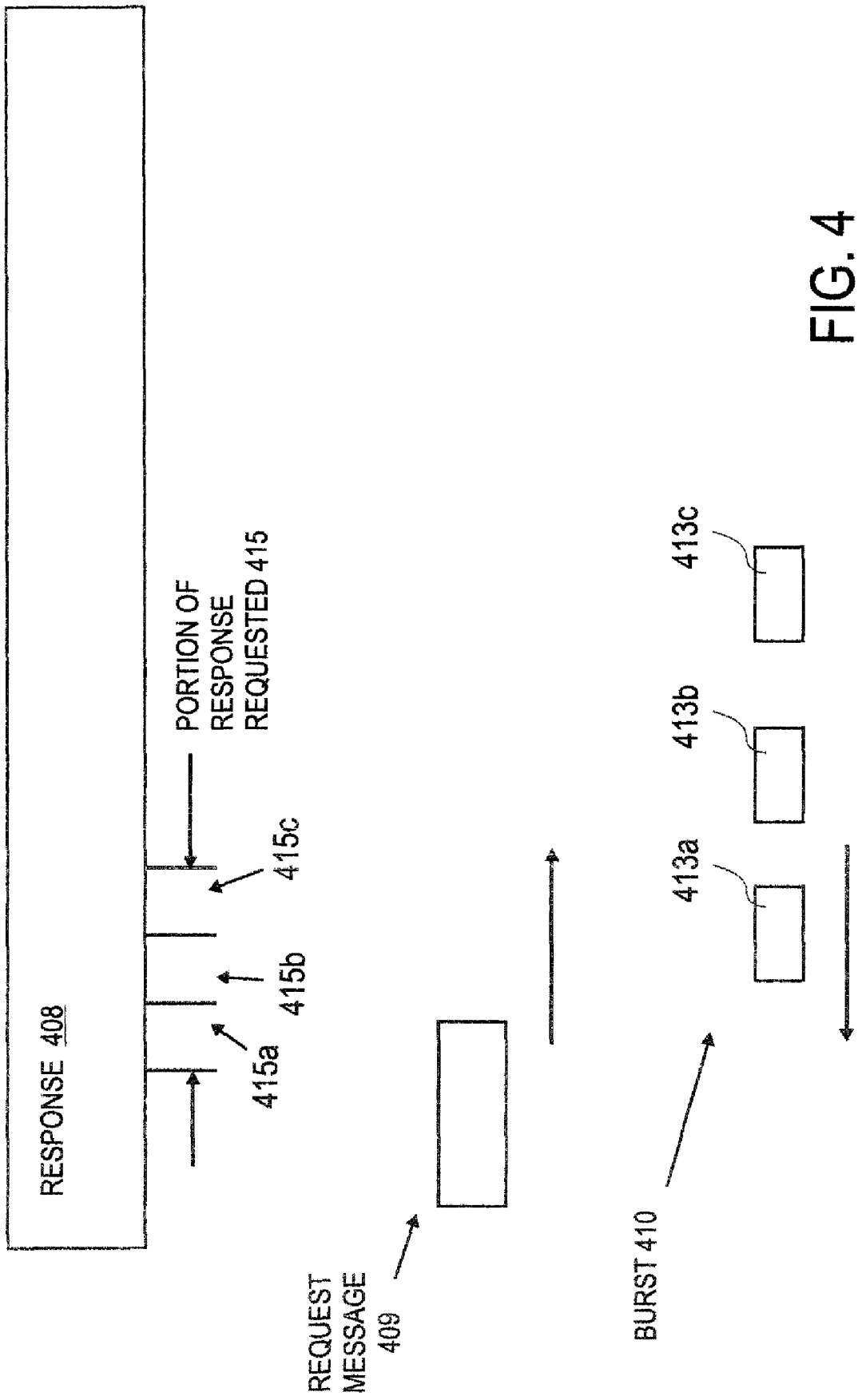
FIG. 4 shows data requested by a client application from a server application, a request message and a burst of reply messages.

FIG. 4 shows a request message 409 that is responded to by a burst 410 of reply messages 413a,b,c. Thus, if request message 409 requests the portion 415 of the response 408 indicated in FIG. 4, the reply messages 413a,b,c that comprise the burst 410 responsive to request message 409 will each carry a further portion of portion 415. For example, reply message 413a carries further portion 415a, reply message 413b carries further portion 415b, and reply message 413c carries further portion 415c.

Referring back to FIG. 3, a more detailed description of the client and server transport layers 307, 311 is provided immediately below. More specifics are provided as to the informational exchange between the client transport layer 307 and server transport layer 310; and the control executed by the client transport layer 307 on the number, rate and size of request and reply messages 309, 313 allowed onto the network 304.

b) Data Flow Implementation

A transport layer, such as client transport layer 307 and server transport layer 310, is a networking layer located on each of a pair of network nodes which is responsible for controlling the flow of information between applications located on each node. In this case, the network nodes correspond to the client 301 and the server 302. Thus, client transport layer 307 and server transport layer 310 together control the flow of information between the client application 305 and the server application 311. The client and server transport layers 307, 310, acting as a whole, effectively possess an understanding of the capacity limits of the client 301, server 302 and network 304, in order to implement a successful transaction.

As described in more detail below, the client transport layer 307 is configured to: 1) send information that is indicative of the client's and/or network's capacity to the server transport layer 310 so that the server 302 does not send reply messages at a rate or size which exceeds the client's and/or network's capacity; 2) monitor the performance of the network 304 (and in some embodiments the client 301 as well) as it supports the transaction; 3) throttle the flow of information between the client 301 and server 302 down/up as network performance falls/rises by controlling the number and/or size of the request and reply messages allowed onto the network for the transaction.

Also as described in more detail below, the server transport layer 310 is configured to: 1) send information to the client transport layer 307 that is indicative of the server's capacity so that the client does not send request messages corresponding to a rate or size of requested information that exceeds the server's capacity; and 2) communicate to the client transport layer 307 the amount of data available in the full response 303.

Recall from above that the client application 305 delivers to the client transport layer 311, in the form of a request 306, a description of an object 303 and an action. The client application 305 may also forward to the client transport layer 307 information that identifies the server 302 (e.g., via an IP address) and a port within the server 302 (e.g., a UDP port). The description 314 of the object 303 and the action may be viewed as the payload of the initial request message 309 (and the following request messages) sent to the server 302 for the particular transaction. Thus the description 314 of the object 303 and the action must be of a size that fits within the request messages 309 whose size may be limited by the capacities of the network, client, and server.

Note that the client application 305 may or may not possess any information as to the size and/or contents of the response 308 that is the subject of its request 306. The client application 305 therefore appends, along with the request 306, guidelines to the client transport layer 307 as to how to craft the response 308. In an embodiment, the client application 305 and the server application 311 are coordinated so as to possess a common reference system for identifying portions of the response 308. As a result, the client application 305 can specially craft the request 306 in light of its degree of knowledge of the response 308.

The full response (i.e., the complete result of the described action to the described object 303) is viewed as a block of data (e.g., one or more bytes). The block may be viewed as having an initial address of zero and terminating address of N that is reflective of the size of the block. In an embodiment, the response 308 is byte addressable meaning there is a unique address for each byte of information in the full response. Thus, if the full response is 50 bytes in size, N=49.

The guidelines passed along with the request 306 from the client application 305 to the client transport layer 307 take the form, in such an embodiment, as a starting address and terminating address. Thus, as an example, if the client application 305 has sufficient knowledge of the full response to understand that it only needs the later half of the full response, the client application 305 may append to the request 306 a starting address of N/2 and a terminating address of N.

Alternatively (or in combination) the terminating address may be effectively specified by an "extent" value. An extent value specifies the amount of information (e.g., in bytes), following the initial address, that should be used to form the response 308. For example, if the client application 305 has sufficient knowledge of the full response to understand that it only needs the later half of the full response, the client application 305 may append to the request 306 a starting address of N/2 and an extent value of N/2.

If the client application 305 does not possess any information about the size and/or contents of the full response, the client application 305 may simply request that the full response be delivered in its entirety. A full response may be requested by specifying a starting address of zero and extent value that it is interpreted by the server application 311 as "the full response". For example, in one embodiment, an extent value of zero is interpreted as "full response".

Once the client transport layer 307 possesses the description 314 of the action and the object 303 via the request 306 and its appended information such as the identity of the server 303 and guidelines as to how to craft the response 308, the client transport layer 307 creates a new transaction and assigns to it a unique "transaction identifier". In various embodiments, the transaction identifier is carried by each request and reply message associated with the transaction. The client transport layer then forms and sends the first of one or more request messages.

In an embodiment, each request message 309 (including the first request message) includes information identifying the object 303 being addressed and instructions to the server for what action to take and which portion of the full response should be sent. Thus, for example, address and extent parameters are included in every request message 309. In case the response 308 is of a size that is beyond what the client 301 and/or network 304 can handle in a single, initial reply from the server 302, the client transport layer 307 incorporates into the initial request message 309 (e.g., as header information 315) information that is indicative of the client's and/or network's capacity.

In an embodiment, this information takes the form of limitations placed on the size of the server's reply. For example, a further embodiment employs a "burst limit" (also referred to as a client burst limit) and a "datagram limit". The burst limit indicates to the server transport layer 310 the maximum allowable size (e.g., in bytes) of the reply. The datagram limit indicates to the server transport layer 310 the maximum size that may be used for each reply message 313.

Thus if an initial request message has a starting address of zero, an extent value interpreted as "the full response", a burst limit of 30 K bytes and a datagram limit of 8 K bytes; for a full response that is 80 K bytes in size, the server transport layer's 310 maximum allowable response to the initial request message 309 is a burst of three 8 K byte reply messages and one 6 k byte reply message. That is, the first reply message of the burst will carry the first 8 K portion of the full response, the second reply message of the burst will carry the second 8 K portion of the full response, the third reply message of the burst will carry the third 8 K portion of the full response and the fourth reply message of the burst will carry the following 6 k portion of the full response.

In an embodiment, the server application 311 makes the response 308 available to the server transport layer 310. In this case, the server transport layer 310 chooses those portions which it determines should be sent at the present time and encapsulates them into reply messages. In such an embodiment, the server application 311 is expected to make available any portion of the response 308 which the server transport layer 310 may require. In another embodiment, the server application 311 is only expected to make available a limited portion of the response 308, such limitations being coordinated with the client transport layer via the server transport layer 310. For each request message, in an embodiment, the server application 311 also responds with the amount of data remaining available in the full response 303 beyond the request's address.

The server transport layer 310 may respond with less than the maximum allowable reply to the request message 309 if the server's capacity limitations so dictate. For example, in an embodiment, the server 302 maintains a second burst limit (i.e., a server burst limit) that limits the amount of information the server 302 is willing to send in response to a request message 309. The server transport layer therefore takes the minimum of the client burst limit (which was received in the request message) and the server burst limit to determine the size of the portion of the response 308 that is sent to the client 301 in reply to the request message.

Recall from above that the server transport layer 310 is configured to: 1) send information to the client transport layer 307 that is indicative of the server's capacity so that the client does not send request messages corresponding to a rate or size of requested information that exceeds the server's capacity; and 2) communicate to the client transport layer 307 the extent the response 308 remaining or available.

In an embodiment, the server transport layer 310 sends to the client transport layer 307 (e.g., in each reply message 313) the server burst limit to effectively communicate the server's capacity to the client transport layer 307. In a further embodiment, the server sends to the client (e.g., in each reply message 313) the size of the response 308 as told to it by the server application 311 or as it calculates it if the server application 311 delivers the response 308 rather than a portion of the response 308. In further embodiments, the server may include a maximum rate of flow, a limitation on simultaneous transactions, a limitation on datagram sizes, or other indications of load or restrictions on the transaction.

Thus, when the client transport layer 307 first receives a reply message it may learn: 1) the amount of data available 303; 2) the portion of data which has been sent by the server transport layer 310; and 3) the size of the server's current limitations on burst and datagram sizes. From this, the client transport layer 307 is able to create and begin maintaining an accurate assessment of the transaction's state.

In an embodiment, the server transport layer 310 may include in the reply message(s) an "object identifier". An object identifier is a reference code unique to the object 303 that is the subject of the transaction. As such, an object 303 may be referred to by its identifier rather than the description provided by the client application 305. Because an object identifier typically consumes less space than an object description, subsequent references to the object 303 during the present transaction (e.g., as found in request messages following the initial request message) made with the object identifier can reduce overhead associated with the processing of the transaction.

In a further embodiment, the server transport layer 310 may also indicate that the object identifier may also be used for other (e.g., later) transactions that reference the object 303. For example, upon receipt of such an indication, the client transport layer 307 may forward the object identifier to the client application 305. If a subsequent transaction arises that makes reference to the object 303, the client application 305 can submit the object identifier rather than a description of the object 303 to the client transport layer 307 to initiate the transaction. In order ensure correctness of the object identifier, the server must warrant that an identifier will not be reused within the conceivable lifespan of a transaction.

Once a reply message has been received by the client transport layer 307, it may create and new request message 309 which requests another portion of the response. This new request message 309 will contain: 1) a starting address corresponding to a portion of the response not yet received or in transit; and 2) an extent value equal to the difference between the window size (discussed in more detail below) and the amount of response data currently deemed on the network.

Thus, typically, with each reply message received at the client 301, the client transport layer 307 builds another request message having a starting address and extent value that are "slid forward" to bound the next portion of the response to be requested. The final request message is sent when the extent value corresponds to the last address of the response. Under ideal conditions, no loss occurs. That is, all request messages successfully (i.e., complete and with tolerable delay) arrive at the server 302 and all reply messages successfully arrive at the client 301.

2.0 Non Contiguous Window a) Overview

As network 304 congestion rises, various request 309 and reply 313 messages may experience delay and/or become lost. The client transport layer 307 possesses functionality to recover requested response information that has never arrived as well as reduce the offered load to the network 304 as it becomes more congested.

Recall from the background that sender-oriented transport layer protocols, like TCP, regulate the amount of data allowed on the network at any given time by limiting the range of addresses which may be transmitted. This range of in transit addresses is referred to as the a window 204. New data 201 may not be sent until all of the data up to the address equal to the new data less the window size has been acknowledged 203.

Thus transport layers using TCP-like methods treat the window of in transit data as a single contiguous block of addresses. Alternative TCP implementations may allow portions of this block to acknowledged independently, but new data is never sent until the earliest portion of the window is acknowledged, allow the entire window 204 to slide forward.

Figure 5A:
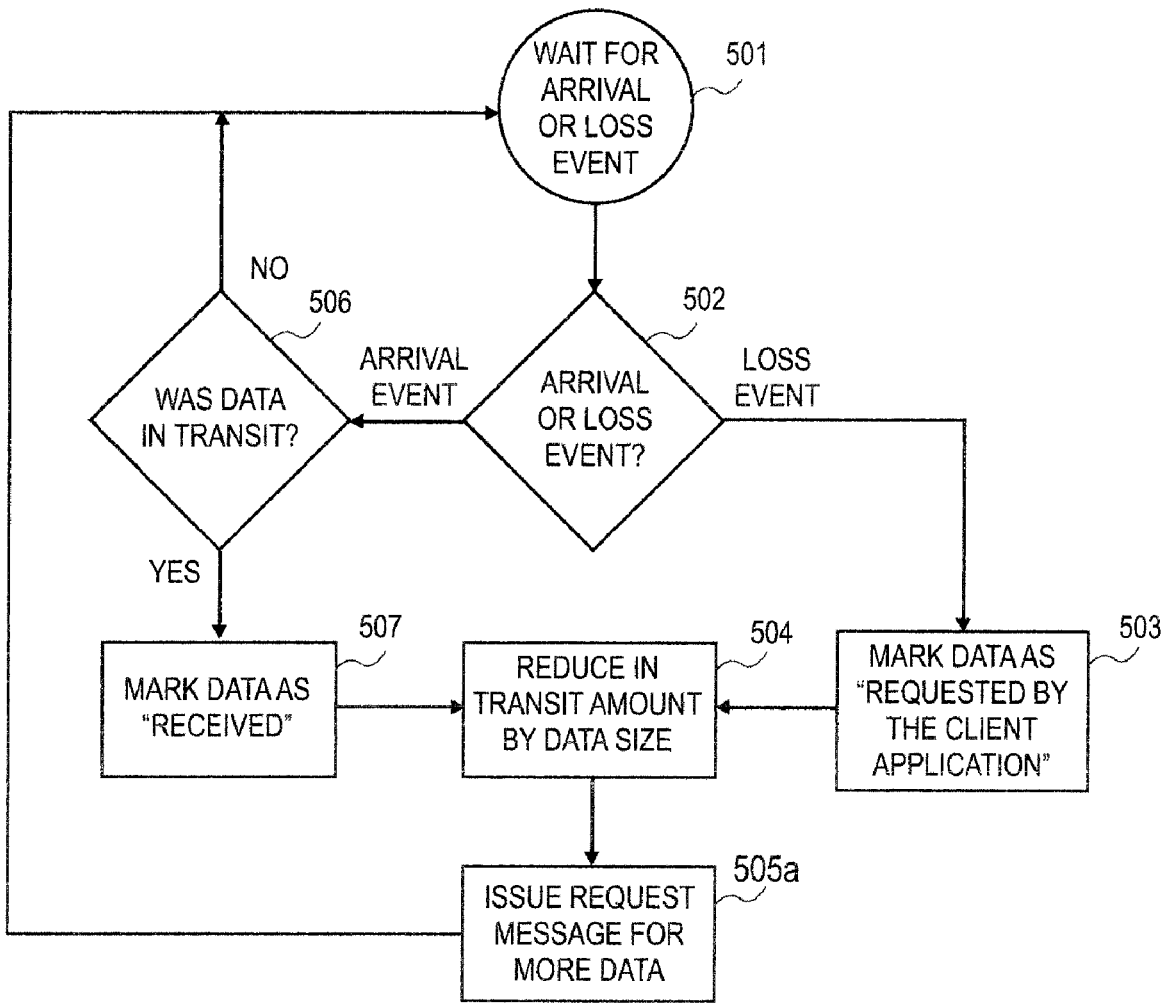
FIG. 5a shows a methodology for a non contiguous window.
Figure 5B:
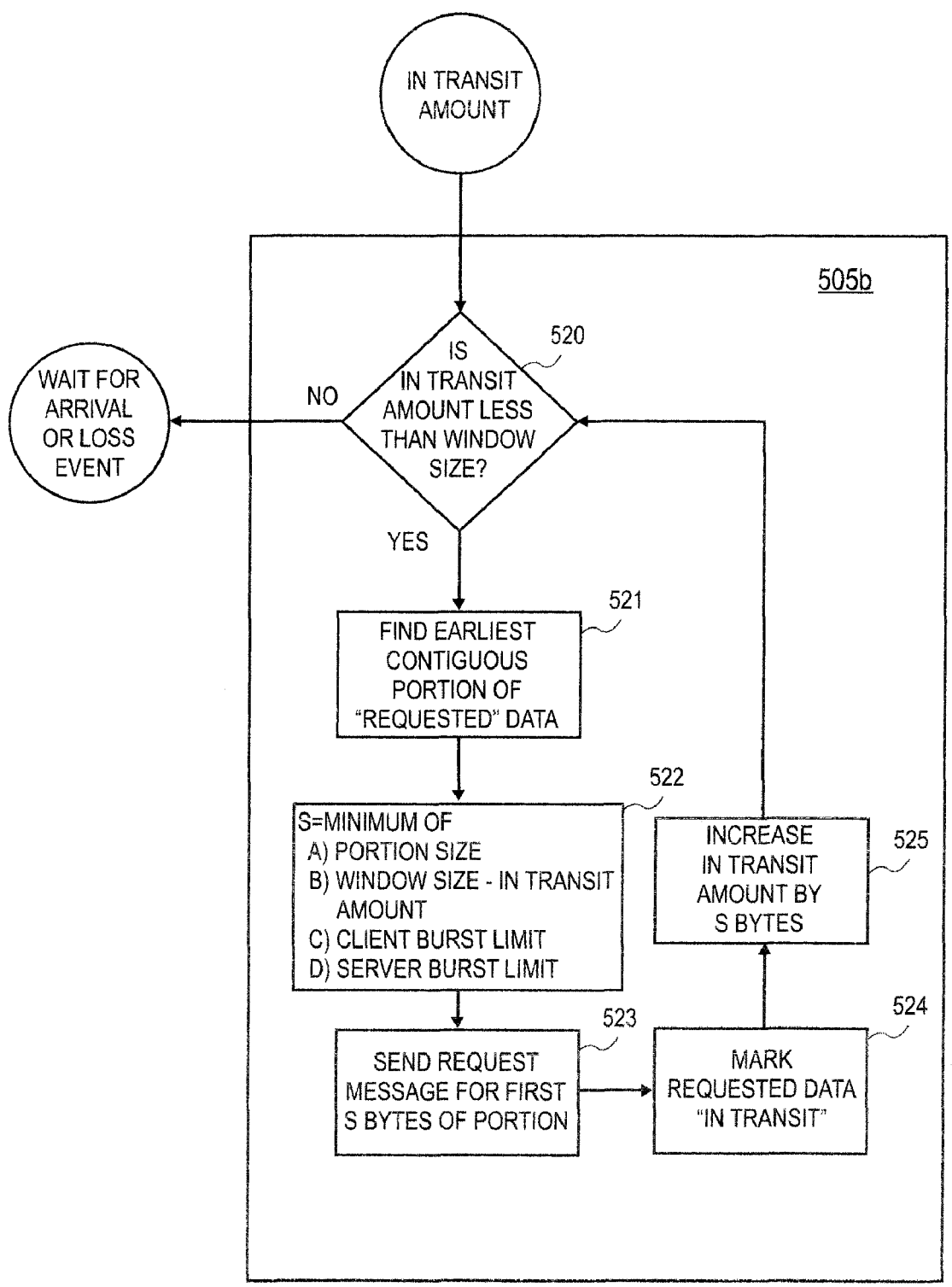

FIGS. 5a and 5b illustrate another transport layer approach which may be referred to as a non contiguous window approach. A non contiguous sliding window strategy limits the quantity of data in transit, but not the range of addresses. Thus, new data may be sent upon the arrival of any in transit data at the client. Because it is not necessary to wait for the earliest data in transit to arrive before requesting new data, the window may become fragmented and span an arbitrarily large range of addresses.

The non contiguous window approach discussed with respect to FIG. 5 may be executed by the transport layer 307 of FIG. 3. As such, the following discussion effectively incorporates a non contiguous window approach into the client transport layer 307 of FIG. 3. It is to be understood, however, that networking technologies that operate according to methodologies that are different, in various respects, than the particular transport layers 307, 310 discussed above with respect to FIG. 3 may also employ a non contiguous window approach.

In a non contiguous window approach, the entirety of the response 308 is partitioned into three states: 1) requested by the client application; 2) in transit; and 3) received. Data that is "in transit" is that portion of the response 308 that has been asked for via a request message 309 (that was sent from the client transport layer 307 to the server 302) but not, as yet, received at the client 301. As this data is most likely presently located on the network 304 it is labeled "in transit".

Data that is received is that portion of the response 308 that not only has been asked for via a request message 309 (that was sent from the client transport layer 307 to the server 302) but also has been received at the client 301. Data that is "requested by the client application" is that portion of the response 308 for which no request message 309 is pending. With respect to the operation of the non contiguous window, note the temporal perspective of the term "requested by the client application". That is, the entirety of the response 308 data may be deemed to have been requested (via request 306) by the client application 305. As such that portion of the response 308 not yet in transit or received remains requested by the client application 305.

Referring to FIGS. 3 and 5a, the client transport layer waits 501 for an event such as the arrival of the "in transit" portions of the response 308 or the declaration of a loss. If the client receives a reply message 313, an arrival event occurs. If the client declares an "in transit" portion of the response to be lost (e.g., if a reply message does not arrive before the expiration of a timer that began counting upon the release of the reply message's corresponding request message) a loss event occurs.

The occurrence of an event is characterized 502. If a loss event occurs, the portion of the response deemed lost undergoes a state transition from "in transit" to "requested by the client application" 503. The amount of data deemed in transit is reduced 504 by the size of the response portion deemed lost. As described in more detail below, the amount of data allowed on the network 304 is determined by a window size. As the window size increases, more data is allowed in the network 304. As the window size decreases, less data is allowed on the network 304.

If the portion of the response 306 deemed in the "in transit" state is less than the window size, the client transport layer 307 is free to issue 505a a new request message that requests an amount of data equal to the difference between the window size and the quantity of response data 306 deemed "in transit". The client then awaits for the occurrence 501 of the next event.

If an arrival event occurs (i.e., if a reply message is received), the client transport layer 307 inquires 506 whether or not the portion of the response 306 received in the newly arrived reply message is currently in the "in transit" state or not. If the received portion is currently in the "in transit" state, it is reclassified 507 as "received" and the in transit amount is reduced 504 by the amount received. This allows a new request message for another portion to be issued.

If the portion of the response 306 just received is not in the "in transit" state (e.g., in the "received state), the reply message is effectively ignored. Note that a reply message can arrive at the client 301 carrying a portion of the response declared "received". For example, recall that when a portion of the response is declared lost, the portion is reclassified 503 as "requested" and another request message for that portion may be issued.

As such, for this particular portion, two request messages will have been issued. It is therefore possible that two reply messages may be received at the client for this portion. The first will trigger the portion to be reclassified 507 as "received". Thus, upon the arrival of the second, the portion will no longer be "in transit" and so the "in transit" amount will not be affected by the second arrival. This will ensure that the "in transit" value remains accurate and thus prevent the client from issuing request messages that correspond to a requested amount exceeding the window size.

Figure 6:
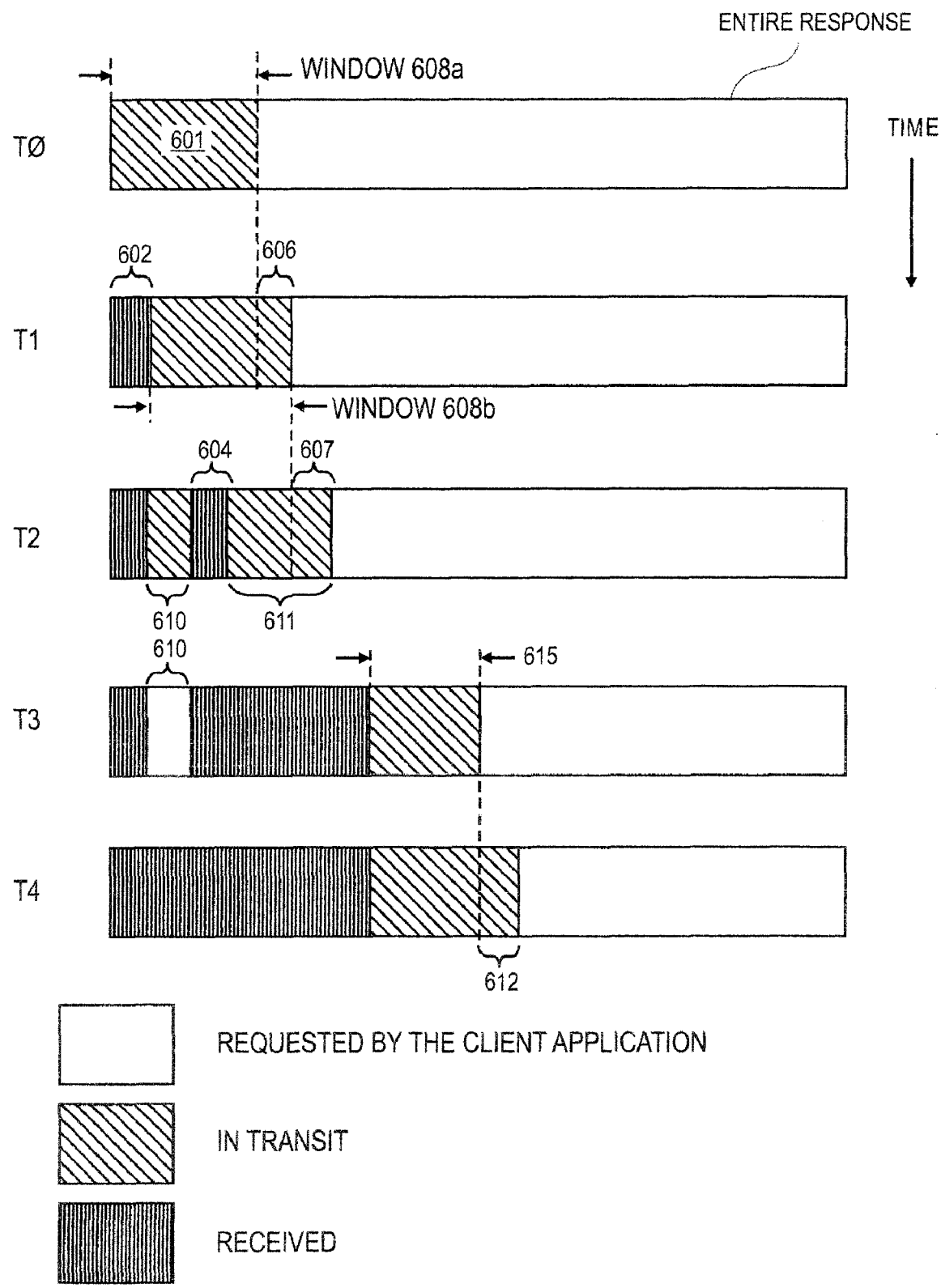
FIG. 6 shows a depiction of a non contiguous window strategy.

Referring to FIG. 6, upon the reception of a request from the client application layer, the client transport layer sends an initial request message to the server at time T0. The portion 601 of the response requested by the initial request message is effectively located within the window 608a discussed above. As discussed above, size of the window 608a may be coextensive with the client burst limit. Thus, the starting address of the initial request message corresponds to the left edge of window 608a while the extent address of the initial request message corresponds to the right edge of window 608a.

The reply message data sent from the server that corresponds to portion 601 of the response is reclassified from "requested by the client application" to "in transit". All further portions of portion 601 are considered "in transit" from the time the request message covering that portion 601 is sent (from the client) to the time that it is received (on time) at the client or declared overdue. As seen in FIG. 6, a first portion 602 of response portion 601 is received on time (e.g., by the reception of a first reply message before expiration of a timer) at time T1.

As such, at time T1, portion 602 is reclassified from "in transit" to "received". The "in transit" amount is therefore reduced by an amount coextensive with portion 602. As discussed above, the client transport layer is configured to allow an amount of reply message data on the network corresponding to the size of window 608a. As such, after the successful reception of portion 602 at time T1, the client transport layer constructs and sends a second request message that asks for the next portion 606 of the response. The size of portion 606 is equal in size to portion 602. Thus, window 608a effectively slides forward after the second request message is issued (i.e., window 608b has a width equal to window 608a).

As seen at time T2, a second further portion 604 of response portion 601 has been successfully received (i.e., "on time") at the client. Assume that this newly received further portion 604 corresponds to the data carried by the third of four reply messages that the server sent as a burst responsive to the initial request message sent at time T0. Because further portion 604 of the response has been successfully received, the client transport layer reduces the "in transit" amount by the size of further portion 604 which allows the client transport layer to construct and send a third request message that asks for portion 607.

The amount of portion 607 is equal to the amount in the newly arrived further portion 604. Thus, portions 610 and 611 together represent an amount of data that is coextensive with window size 608a, 608b. Note that the window is non contiguous after the third reply message 604 is received. That is, an amount of data coextensive with window size 608a,b is currently allowed on the network. However, the specific portions of the response asked for are not contiguous (i.e., not adjacent to one another).

Eventually, at a later time T3, portion 610 is declared lost (e.g., a second of four reply messages associated with a server burst responsive to the initial request message is regarded as lost by the network). A timer, referred to as the "repeat interval", is used to makes this declaration. Whenever a portion of the response is requested, a timer is started. Any portion of the requested data that is not received by the client within the repeat interval is declared lost. Portion 610 is reclassified as "requested by the client application" at time T3 as seen in FIG. 6. Note that between times T2 and T3, data flow has continued and a window segment 615 has slid forward as reply messages have been received and further request messages issued. Window segment 615 has a width equal to window segment 608a minus the missing quantity of data from portion 610. Thus, because window segment 615 can continue to slide forward, the delay or loss of portion 610 has not halted the transaction.

Immediately after time T3, the amount of data classified as "in transit" is less than the window size. This allows a new request message to be sent that "re-requests" portion 610. After portion 610 is re-requested, the amount of data in transit is once again coextensive with the original window size 608a,b and portion 610 is re-classified as "in transit". Given this immediate re-request of 610, and assuming the correct arrival of a corresponding reply message shortly thereafter, time T4 illustrates portion 610 reclassified as "received" and a new request message issued for portion 612.

As discussed in more detail below, portion 610 is re-requested at this time because the client transport layer is configured to request the earliest (i.e., closest to the left edge of the entire response as seen in FIG. 6) contiguous portion of the response classified as "requested by the client application". Note that assuming the next reply message is successfully received, the leading (right) edge of the non contiguous window will slide forward regardless of which response portion the reply message carries. Thus, other embodiments may choose alternative scheduling for the re-request of portion 610.

Note that, in the example discussed with respect to FIG. 6, the window size is fixed. That is, the window size does not change over the course of events discussed with respect to FIG. 6. As described in more detail below, the window size may be adjusted in light of changes observed in the network's performance.

For example, lost portion 610 may be used as form of indicia that the network's performance is falling (i.e., it cannot reliably carry an in transit amount corresponding to the current window size 608). In response, the client transport layer may reduce the window size. If so, the further request message (mentioned above) that is sent in response to portion 610 being declared lost would not be immediately sent to the server.

Depending upon the extent that the window size is reduced, there may be more data in transit immediately after the reduction is made than the new window size allows. As such, the further request message that re-requests portion 610 may be delayed until a sufficient amount of in transit data is received by the client. That is, as the client receives in transit data, the in transit amount is continually reduced and in so doing approaches the new window size in extent. Eventually enough data will be received or declared lost such that the in transit amount is less than the new window size. At this time, the amount of data in portion 610 corresponding to the difference may be re requested by a further request message.

b) Methodology For Non Contiguous Window

FIG. 5b shows an embodiment of a methodology 505b that the transport layer may use to determine which portion of a response to request. Note that the methodology 505b of FIG. 5b may be viewed as a detailed embodiment of the request 505a for more response data shown back in FIG. 5a. To first order, if the amount of data classified as "in transit" is greater than or equal to the window size (e.g., as a result of the window size being adjusted downward because of network congestion), no request message is issued 520.

If the amount of "in transit" data is less than the window size the client transport layer can issue a request message 520. The client transport layer looks 521 for the earliest, contiguous portion of the response that is classified as "requested by the client application" (e.g., portion 610 in FIG. 6 at time T3). The client transport layer then identifies 522 the minimum "S" of: 1) the size of earliest, contiguous portion; 2) the difference between the window size and the amount of data classified as "in transit"; 3) the client burst limit; and 4) the server burst limit.

A request message is then prepared and sent 523 that requests the earliest S extent of the portion. The portion is then reclassified 524 from the "requested by the client application" state to the "in-transit" state and the "in transit" amount is increased 525 by S. The process then repeats. That is, the a new request message will be issued if the in transit amount is still less than the window size. Otherwise, the transport layer waits for the next event.

As noted above, alternative embodiments may use a different criteria for selecting which portion of the response to next request. One such embodiment adds an additional state "lost" for response portions which have been declared lost but not yet reclassified as "requested by the client". In such an embodiment, when a data portion is declared lost, it is moved to this new "lost" state and the in transit amount is reduced as for the previous embodiment. However, portions classified as "lost" are not eligible to be re-requested. The "lost" portion is only reclassified as "requested by the client" (and thus made eligible for re-request) after some amount of time has passed since it was declared lost.

Should the missing portion arrive while classified as "lost", it would be reclassified as "received", but the in transit amount would not be reduced (since it was already reduced by the loss declaration). Such an arrival during the "lost" state prevents a re-request that would have otherwise resulted in a duplicate reply message. Thus this fourth state allows extra time for substantially delayed data to arrive (reducing the occurrence of duplicates) but without holding back the flow of data or delaying the flow control adjustments discussed below. Other embodiment alternatives might add mechanisms to adjust these time intervals or to forgo the "lost" state as the end of the transaction nears.

3.0 Flow Control a) Overview

Referring back to FIG. 3, recall from above that the client transport layer 307 is responsible for 1) monitoring the performance of the network 304 (and in some embodiments the client 301) as it supports the transaction; and 2) throttle the flow of information between the client 301 and server 302 down/up as network performance falls/rises by controlling the number and/or size of the request and reply messages allowed onto the network for the transaction. The client burst limit and/or datagram size may be changed as the client transport layer 307 decides to change the information flow between the client 301 and server 302 in response to its monitoring of the network 304.

For example, as alluded to just above, the declaration of a lost, requested portion of the response may trigger a retraction of the window size. The flow of information between the client and server is the amount of data per unit time that flows between the client and server within the network 304. The flow of information between the client and server may be throttled up or down by changing the window size and/or datagram size (i.e., reply message size).

Under typical conditions, increasing the window size will increase the flow because more data is allowed onto the network per unit time. Also, under typical conditions, increasing the datagram size (e.g., the size of the reply messages sent from the server) will increase the flow for a fixed window size. For a fixed window size, increasing the datagram size results in fewer (yet larger) messages on the network. As a result, the network has less overhead (i.e., fewer messages to determine the routing for) and is able to operate more efficiently. As the network operates more efficiently, the data per unit time (i.e., the flow) between the client and server increases.

Figure 7:
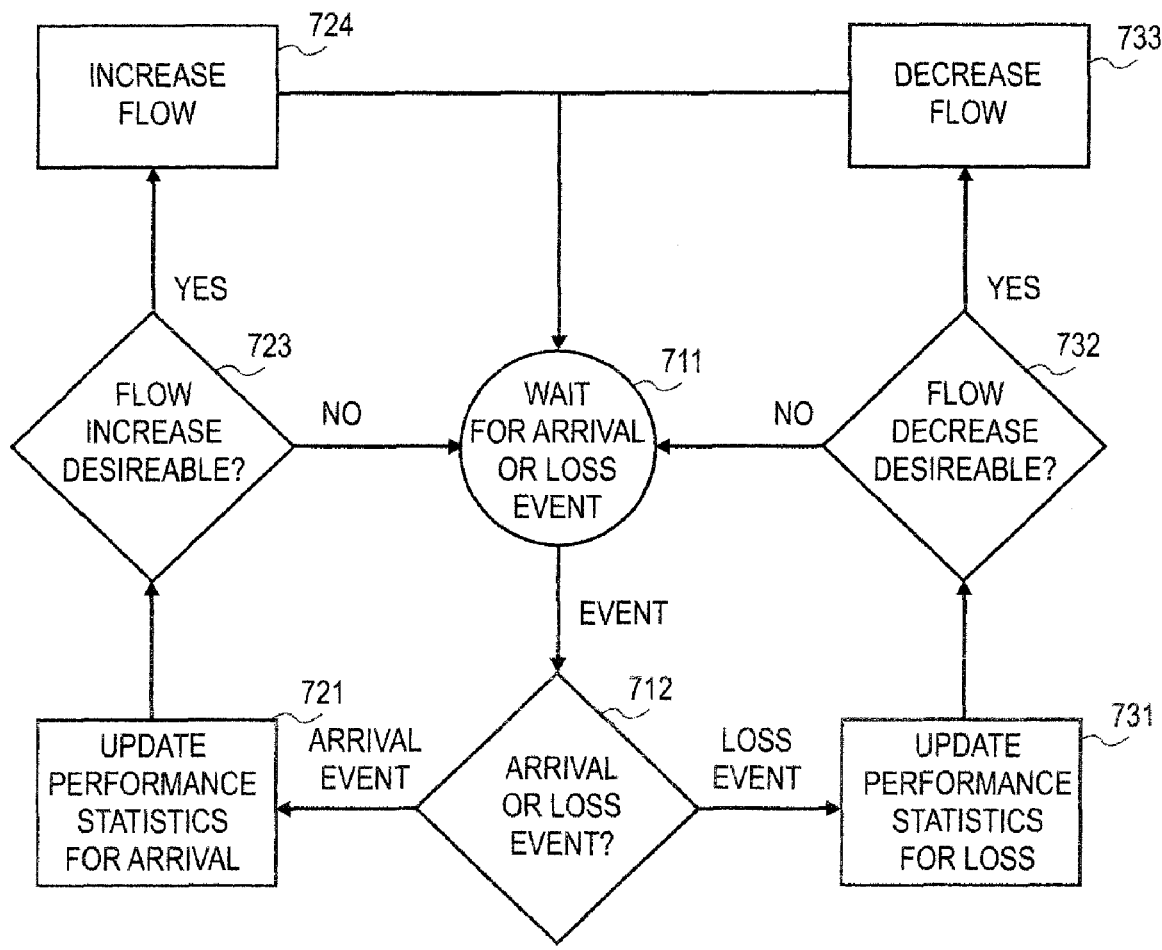
FIG. 7 shows a flow control method that may be used by a client to control the flow between a client and a server.

FIG. 7 shows an example of a flow control mechanism 700 that may be used to throttle the flow between the client and server up or down in light of monitored performance related statistics (e.g., networking delay statistics). The flow control approach of FIG. 7 may be executed upon the client transport layer 307 of FIG. 3. Thus, for simplicity, the flow control technique of FIG. 7 is presented in the discussion that follows as being incorporated into the client transport layer 307 of FIG. 3. It is to be understood, however, that networking technologies which operate according to methodologies that are different, in various respects, than the particular transport layers 307, 310 discussed above with respect to FIG. 3 may also employ the flow control technique (or one or more portions thereof) illustrated in FIG. 7.

An inquiry into whether or not the flow should be increased or decreased may be initiated upon an event; that is, the successful arrival of a reply message or a declaration that a requested portion of the response is lost. For example, the continued successful arrival of reply messages may be used as an indicator that the network is currently running well below its capacity. As such, the flow may be increased. Similarly, for example, the loss or continued loss of requested portions of the response may be used as an indicator that the network is currently running at or near its capacity. As such, the flow may be decreased.

The flow control mechanism 700 of FIG. 7 waits 711 for either of two events: the successful arrival of a reply message or the declaration that a requested portion of the response has been lost. In either case, performance statistics are updated 721, 731 to reflect the occurrence of the new event. More details as to specific statistics that may kept are discussed below.

Once the performance statistics are updated 721, 731, an inquiry is launched into whether or not the flow should be increased 723 (if the event was a successfully received reply message) or decreased 732 (if the event is a requested portion of the response being declared lost). If the inquiry results in no flow adjustment being made, the transport layer waits 711 for another event to occur. If the inquiry results in an adjustment being made, the flow is increased 724 (if the event is a successfully received reply message) or decreased 733 (if the event is a declaration that a requested portion of the response is lost). More details of some possible embodiments for the various processes described above are discussed below.

b) Flow Increase

Figure 8:
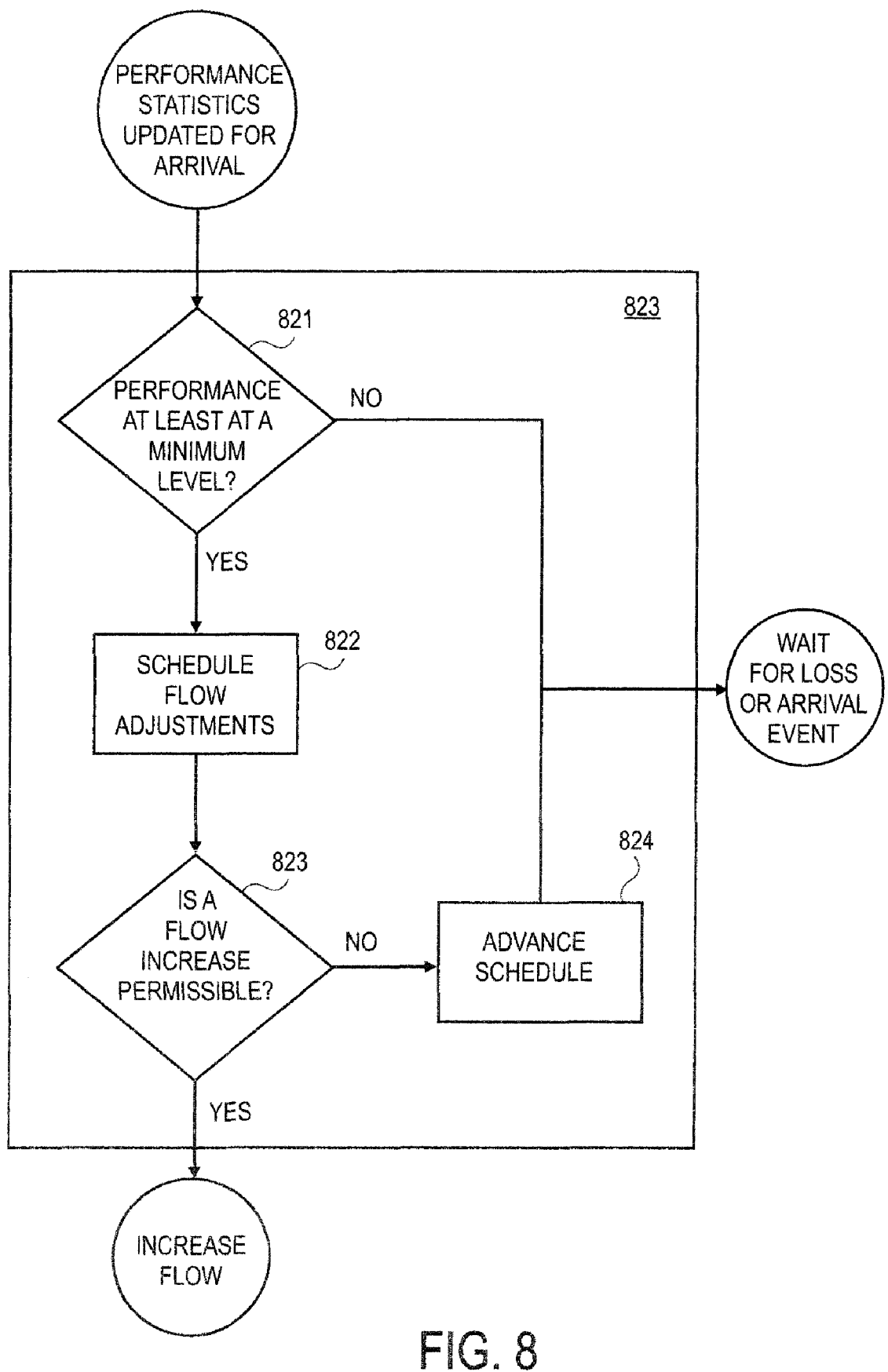
FIG. 8 shows an embodiment of a method for determining whether a flow increase is desirable.

FIG. 8 shows an embodiment 823 of a methodology that may be used to inquire as to whether or not the flow should be increased given that a reply message has successfully arrived. That is, the methodology of FIG. 8 corresponds to an embodiment that may be used for process 723 of FIG. 7. Referring briefly back to FIG. 7, recall that performance statistics are first updated 721 to reflect the arrival of the reply message. Performance statistics are values that reflect how closely the network (and perhaps the client) is operating with respect to its maximum capacity.

To first order, as seen in the example of FIG. 8, the current performance level of the client and network (as embodied in the current collection of performance statistics) is checked 821 against a minimum performance level that the client and network must be at or better than if any flow increase is to occur.

Note that the performance level has a temporal aspect that is typically measured as some form of delay. For example, as more response data is allowed to be simultaneously transported across the network, more delay will be observed in the transportation of the data. For purposes of this discussion, the increase in delay corresponds to a decrease in performance level even though the network may be carrying more information than before. Sequence 821 of FIG. 8, based upon an inquiry into the performance of the network (and the client in various embodiments) as determined from the current status of the performance statistics, controls whether or not an increase in the flow may be entertained.

Thus, referring to FIG. 8, no increase in flow is allowed if the network or client is not operating at least as well as a minimum performance level. If the network and client are operating within acceptable parameters, flow control adjustments are scheduled 822. Scheduling a flow control adjustment corresponds to the setting of any parameter that has an affect on when the flow will be changed.

For example, in an embodiment, the scheduling of flow control adjustments 822 is governed by setting a delay between the last adjustment made, and when the next adjustment may occur. In a further embodiment, the delay is measured by the total number of bytes which have been either received in valid reply messages, or which have been declared lost. Other embodiments may use different units or a combination of factors (e.g. elapsed time).

The appropriate flow control adjustment scheduling 822 can be determined in light of the most recent performance statistics (e.g., as initially calculated in process 721 of FIG. 7). Given these statistics and the record of delay since the last adjustment, a determination 823 is made as to whether or not an adjustment is permissible at the present time. If it is determined 823 that an increase is permissible, then the flow is increased. If not, the schedule is advanced 824, such as by incrementing the aforementioned delay value, without an increase in the flow.

Figure 9:
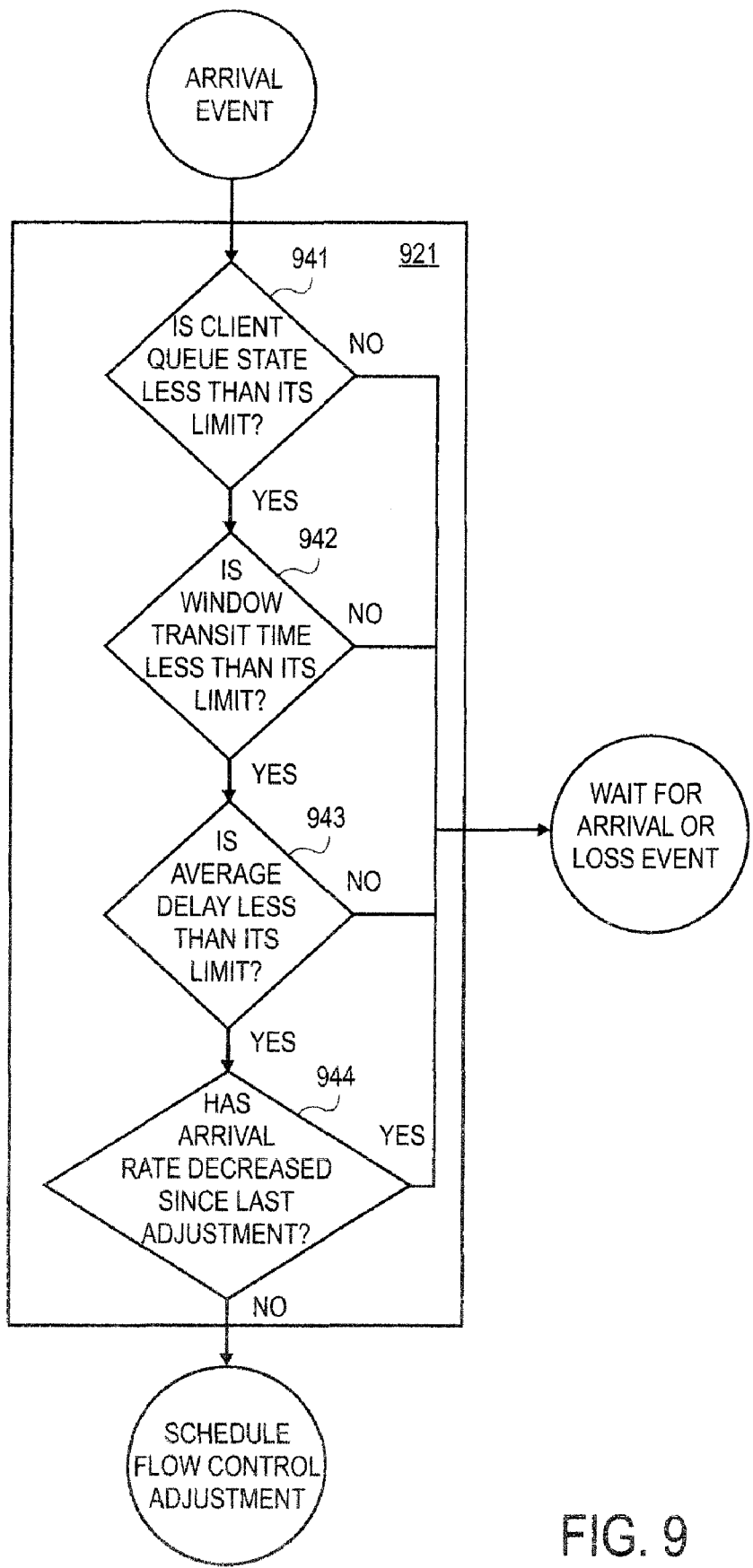
FIG. 9 shows an embodiment of a method for determining whether performance statistics indicate operation at or better than a minimum performance level.

FIG. 9 shows a possible embodiment 921 that may be used to determine 821 whether or not the network is performing better or equal to a minimum performance level before an increase in flow is allowed. That is, methodology 921 of FIG. 9 corresponds to one possible embodiment 821 that may be used for methodology 821 of FIG. 8.

Note that because the methodology 921 of FIG. 9 involves checking the performance statistics to see if a minimum networking and client performance level is reached, the embodiment of FIG. 9 also provides insight into some possible performance statistics that are tracked by the client. That is, referring briefly back to FIG. 7, possible embodiments of those performance statistics that are updated 721 upon the arrival of a reply message are also seen in the methodology 921 of FIG. 9.

Specifically, the following statistics (also referred to as parameters) are used in the example of FIG. 9: 1) the state of an incoming datagram queue; 2) the transit time for a window; 3) the average delay between the time a portion of the response is requested and the time that portion is received; 4) the average arrival rate at which response data is received.

The state of an incoming datagram queue reflects how closely the client is operating to its maximum capacity. That is, typically, the client operating system places a received reply message in a queue before the client transport layer processes the reply message. If reply messages arrive at the client at a rate higher than the client can process them, the amount of data in the queue will grow resulting in a risk of queue overflow and a loss of messages.

If the incoming datagram queue state (i.e., the amount of data waiting in the queue) is less than a limit (e.g., less than 30% of the maximum capacity of the queue), the client is deemed to be far enough from its maximum capacity that an increase in flow may be entertained. Inquiring 941 whether or not the datagram queue state is less than a limit helps prevent the flow from increasing beyond the client's processing capacity.

A window transit time is an estimate of the amount of time which would be required for an amount of data equal to the current window size to be delivered from the server to the client. In an embodiment, this estimate is calculated based upon the observed rate of reply message arrivals. The window transit time thus acts as a prediction of how long the next window should take to traverse the network. Again, a limit (referred to as a window transit time limit) may be determined which the window transit time must not exceed if a flow increase is to be entertained.

Inquiring 942 whether or not the window transit time is less than this limit prevents the delay experienced between request messages being sent and corresponding response messages being received from being dominated by transmission time. This limitation helps ensure that variations in the delay statistics accurately reflect third-party congestion, rather than transmission speeds. The inquiry also helps prevent third-party traffic sharing the same links from experiencing excessive delay. The window transit time limit used may vary by embodiment. In one embodiment it is a constant value of one second. Other embodiments may use a different constant, a calculated value, or a value supplied by the client application or operating system.

The average delay time is the average amount of time consumed waiting for a requested portion of the response (as embodied in a request message for that portion) to be received (as embodied in a reply message having that portion). A limit (referred to as an average delay time limit) may be determined which the average delay time (as calculated to reflect the delay of the newly received reply message) must be less than before a flow increase is to be entertained.

Inquiring 943 whether or not the average delay time is less than this limit prevents the flow from being increased after the network's performance (as to the delay experienced before receiving a particular requested portion) reaches a minimum acceptable level. The calculation of average delay time and its associated limit may vary by embodiment. In one embodiment the average delay time is the weighted average over the delays of the last four reply messages received and the limit is four times the smallest delay observed during the transaction.

The arrival rate is the rate (e.g., in bytes/sec) at which reply message data is received at the client. In the embodiment of FIG. 9, no increase in flow is allowed if the arrival rate is observed to fall after the previous flow increase that was made. By inquiring 944 whether or not the arrival rate has increased since the last flow increase, flow increases can be arrested once they cease to have a positive impact upon performance.

It is important to point out that other performance statistics may be employed besides those listed above. For example, Internet Control Message Protocol (ICMP) routing messages, load indications provided by the client operating system or application, hardware indications of local link congestion, out-of-band congestion reports, accumulated statistics from other transactions, or other indicators might be used to limit flow increases.

It is also important to point out that the number of inquiries may vary from embodiment to embodiment as well. For example, although four different inquiries 941, 942, 943, 944 are made in the example of FIG. 9, other embodiments may be constructed having more or less than four different inquiries into performance statistics.

Figure 10A:
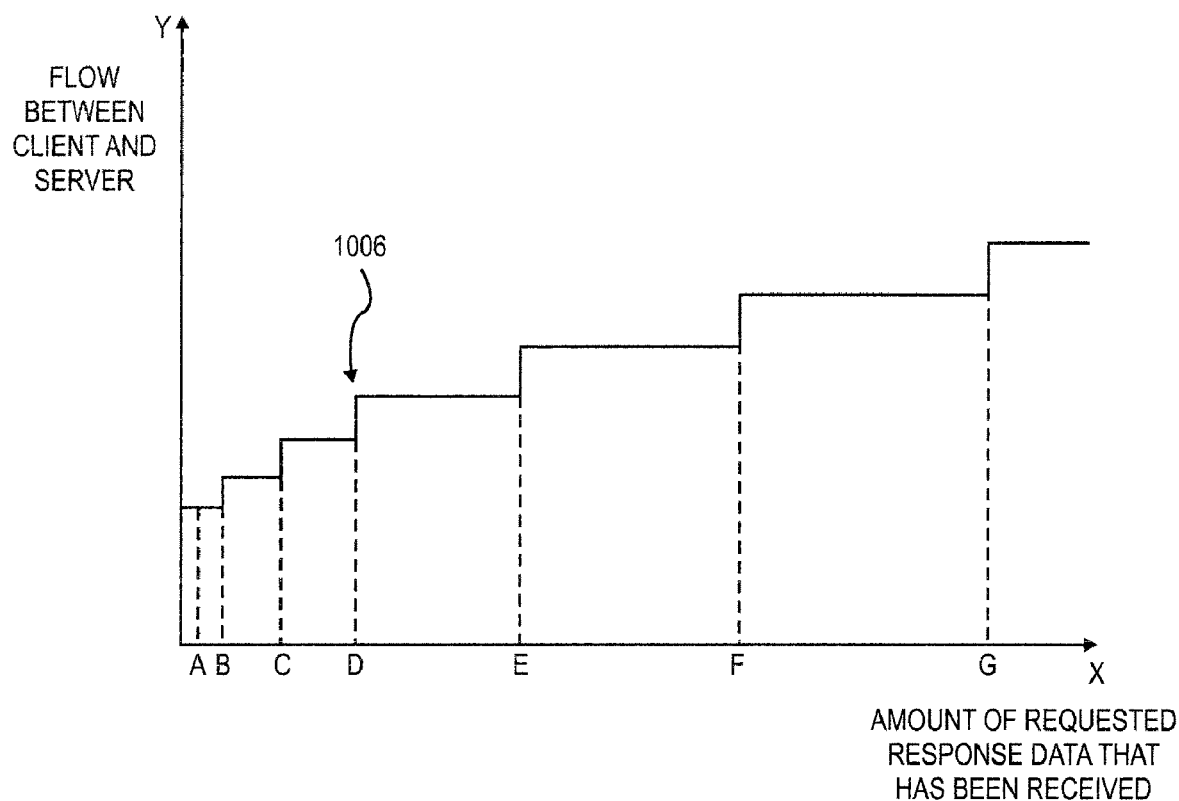
FIG. 10a shows a depiction of increasing the flow between two nodes.
Figure 10B:
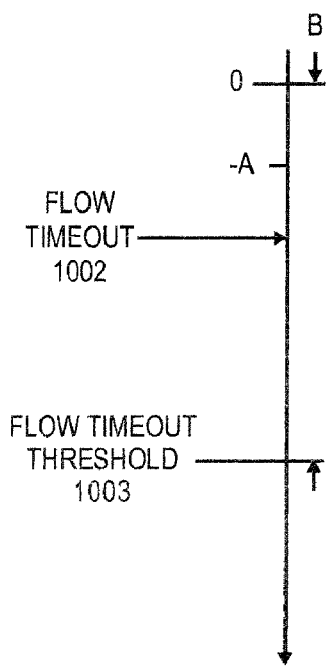
FIG. 10b shows a pointer and threshold scheme for determining when a flow between two nodes should be increased.

Referring back to FIG. 8, as discussed above, if the status of the performance statistics allow an increase in the flow to be entertained, flow adjustments are scheduled 822 and an inquiry 823 is made as to whether or not the flow should be increased at this time given the flow adjustment scheduling. FIGS. 10a and 10b relate to an approach that may be used to implement these procedures 822, 823.

FIG. 10a shows a depiction of how the flow may be increased according to an adjustment schedule that is (as alluded to above) based upon the delay since the last adjustment. The y axis of FIG. 10a corresponds to the flow (e.g., in bytes per second or percentage of capacity) utilized for a particular transaction while the x axis of FIG. 10a corresponds to the amount of requested response data received (e.g., in numbers of bytes) at the client via the reception of reply messages sent by the server. FIG. 10a assumes that, initially: 1) the maximum capacity of the network path has not been reached; 2) there is no significant network congestion.

Referring to FIG. 10b, the scheduling of flow adjustments is governed by a flow timeout pointer 1002 as positioned with respect to a flow timeout threshold value 1003. That is, the position of a flow timeout pointer 1002 as positioned with respect to a flow timeout threshold 1003 controls the delay between adjustments. This flow timeout pointer 1002 is initially set to zero and is decremented by the number of bytes delivered in each reply message. As reply messages are received, the number of received bytes increases. Thus, for each byte received, the flow timeout pointer 1002 moves "down" one unit.

If the flow timeout pointer 1002 (hereinafter referred to simply as the flow timeout) starts at an initial position of zero, the flow timeout 1002 will be positioned at −A once A bytes have been received. An exemplary corresponding amount of A bytes received is also shown in FIG. 10a. The flow timeout threshold 1003 position controls the point in time at which the flow may be increased.

That is, once the flow timeout 1002 falls beneath the flow timeout threshold 1003, the flow may be increased (i.e., adjusted) and the flow timeout 1002 reset to zero. Referring to FIG. 10a, the flow is shown to increase after B bytes have been received. Thus, referring to FIG. 10b, the flow timeout threshold is initially positioned B bytes beneath zero.

Referring to FIG. 8 and FIGS. 10a and 10b, the position of the flow timeout threshold 1003 is determined by the flow adjustment scheduling 822 that calculates the desired delay between adjustments. Sequence 823 is responsible for determining whether or not the flow should be increased and sequence 824 drops the flow timeout 1002 for each byte of received response data. Sequence 823 triggers a flow increase (i.e., an adjustment) when the flow timeout 1002 falls beneath the flow timeout threshold 1003.

Note that the flow timeout threshold 1003 is recalculated for each invocation of the flow adjustment scheduling sequence 822. That is, in an embodiment, a calculated flow timeout threshold is valid only for the current state of the transaction (i.e., upon the occurrence of the latest event) and is not relied upon beyond the question of whether flow should be increased at the present time.

In an embodiment, the flow timeout threshold is calculated as a multiple of the current window size (as discussed previously with regard to the Non Contiguous Sliding Window) where the multiplication factor is determined by present network performance. Thus, as the transaction progresses and the parameters of window size and network performance change, the value calculated for the flow timeout threshold as determined by the flow adjustment scheduling sequence 822 will change. Referring to FIG. 10a, notice that the amount of data received between each flow increase, B, C, and D, grows with each increase in the window size.

Figure 11:
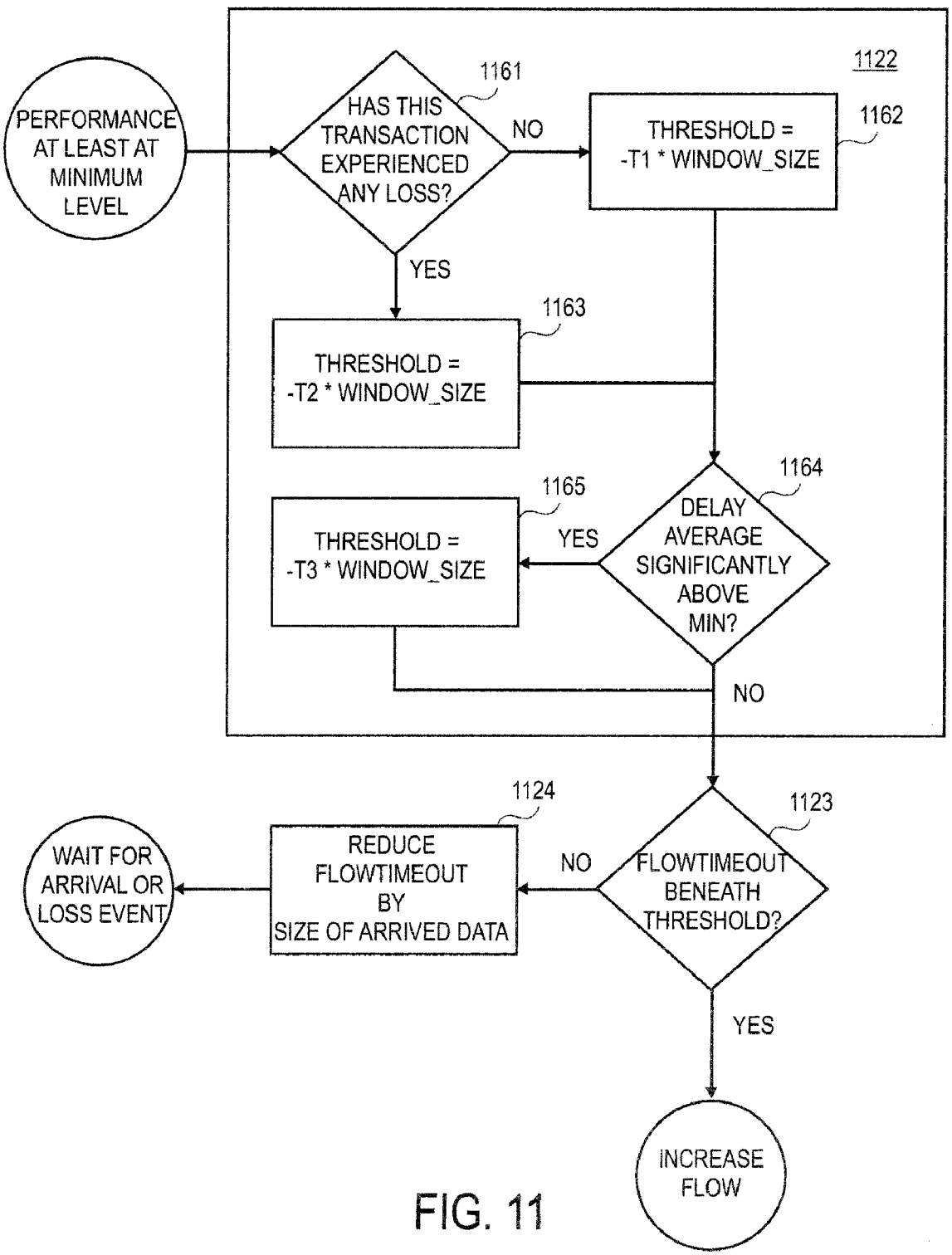
FIG. 11 shows an embodiment of a method for scheduling flow control adjustments, determining whether a flow increase is permissible and advancing a schedule.

FIG. 11 shows an embodiment of a methodology 1122 that may be employed to determine a flow adjustment schedule. FIG. 11 also shows an embodiment of a methodology 1123 that may be employed to determine whether or not the flow is currently scheduled to be increased as well as an embodiment of a methodology 1124 that may be employed to advance the schedule if the flow should not be currently increased. Thus, methodology 1122 of FIG. 11 corresponds to an embodiment of a methodology 822 of FIG. 8, methodology 1123 of FIG. 11 corresponds to an embodiment of a methodology 823 of FIG. 8; and methodology 1124 of FIG. 11 corresponds to an embodiment of a methodology 824 of FIG. 8.

The methodology of FIG. 11 operates consistently with the approach discussed in FIGS. 10a and 10b. That is, the flow adjustment schedule is determined by the progression of the flow timeout 1002 toward the flow timeout threshold 1003. Thus, the methodology 1122 of FIG. 11 is used to determine a flow timeout threshold. The methodology 1122 initially inquires 1161 as to whether or not any loss has been declared for the transaction. If there has not been any loss the flow timeout threshold is set to a first level, if there has been loss the flow timeout is set to a second level where the second level is "beneath" the first level. An examination of network performance is than conducted to determine the final threshold value that will be used for this decision.

The flow timeout threshold levels may be determined by any of a number of different ways. In the particular example of FIG. 11, the first and second flow timeout threshold levels are a factor of the window size. Specifically, the first flow timeout threshold level is −T1*Window_Size and the second flow timeout threshold is −T2*Window_Size where T2 is greater than T1 in order to keep the second flow timeout threshold beneath the first flow timeout threshold (note that Window_Size corresponds to the size of the window, for example, in bytes). This allows the transaction to initially increase the flow more rapidly, and then proceed with greater caution once loss has been encountered.

An additional screening of the network's performance level is made for the final determination of the flow timeout threshold. In the illustrated embodiment, an inquiry 1164 is made to see if the average delay (discussed above with respect to FIG. 9) is greater than or equal to a K*min_avg_delay; where K is a factor and min_avg_delay is the minimum observed average delay for the transaction. In an embodiment, K is a significant value such as 3 or 8.

When the average delay reaches K*min_avg_delay, it is presumed that congestion along the network path has become significant and that it is desirable to space flow increases further apart. In the embodiment illustrated in FIG. 11, the threshold is adjusted to a value of −T3*Window size where T3>T2. The third threshold value is therefore beneath the second. As such, when the average delay reaches K*min_avg_delay, the rate of flow increase is reduced. Referring to FIG. 10a, point 1006 corresponds to this adjustment. Thus, subsequent adjustments E, F and G seen in FIG. 10a show increased latency between adjustments as compared to adjustments B, C, and D.

An increase in the flow can be implemented by increasing the window size each time the flow timeout falls beneath the threshold. Thus as seen in methodology 1123, if the flow timeout is beneath the threshold set by methodology 1122, the flow is increased. Otherwise, the flow timeout is lowered by the size (e.g., in bytes) of the response data received in the reply message. Referring back to FIG. 7, if it is determined that the flow should not be increased, the client waits for another event 711. If it is determined the flow should be increased, methodology 724 is executed.

Figure 12:
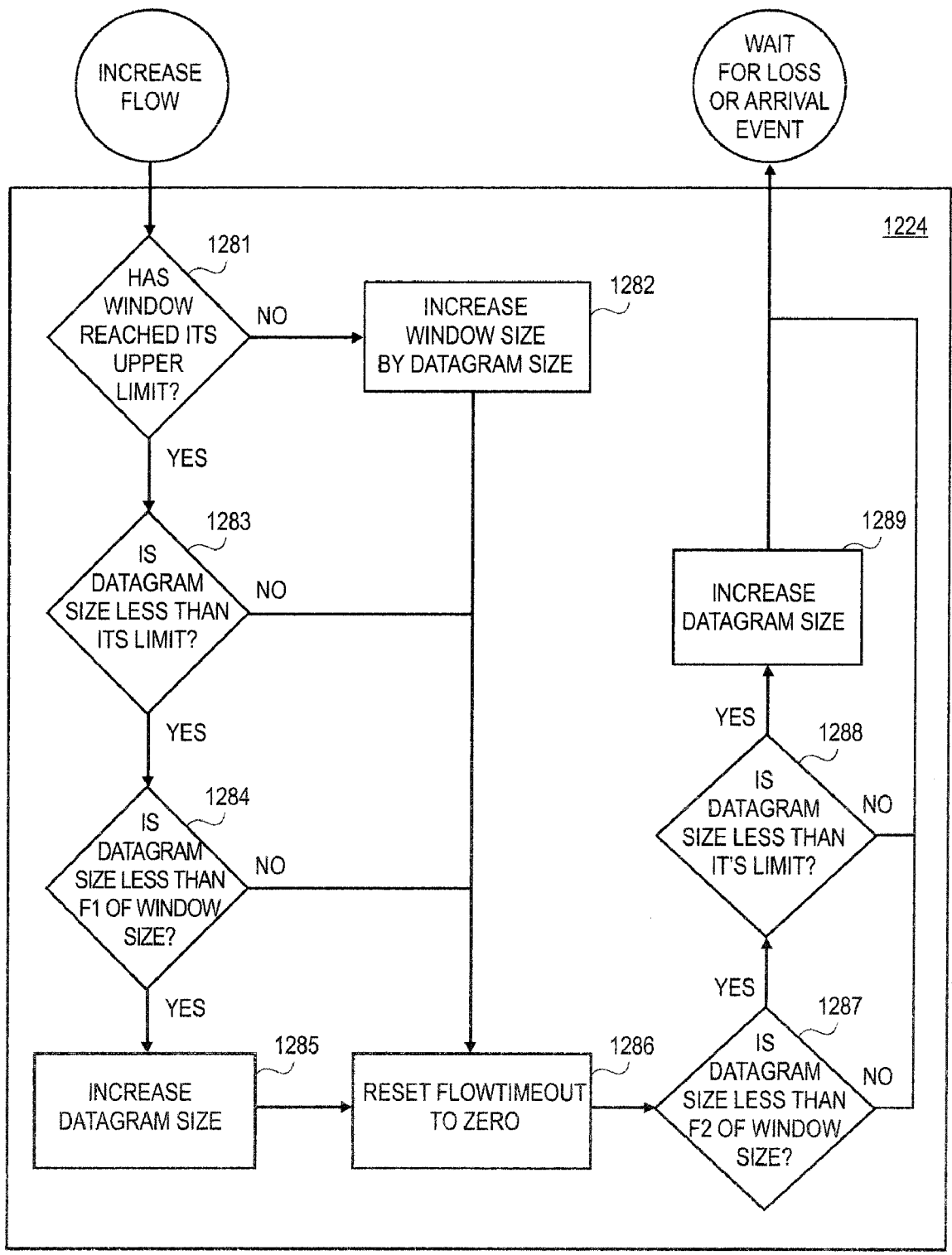
FIG. 12 shows an embodiment of a method that may be used for increasing the data flow between two nodes.

FIG. 12 shows a detailed view of an embodiment 1224 that may be used to implement the flow increase methodology 724 of FIG. 7. In the embodiment of FIG. 12, if the window size is less than a pre-determined maximum allowable window size, the window size is increased 1282. Note that in the particular embodiment of FIG. 12, the window size is increased by the number of bytes allowed in a datagram. Other embodiments may increase the window size by a different amount (e.g., by another fixed amount or by a percentage).

The pre-determined maximum allowable window size may be determined by a number of factors such as the size of incoming datagram queue, client application or operating system preference, observations of previous or concurrent transactions, observations of client load, observations of local link load, or other factors which may suggest an upper bound on permissible data flow. The exact combination of utilized factors may vary between embodiments.

If the window size is at its maximum allowable size, an attempt is made to increase the flow by increasing the datagram size. Thus, an inquiry is made 1283 into the size of the datagram now being used. If the size of the datagram is less than the maximum allowable datagram size, the datagram size is checked again 1284. Specifically, if the datagram size is below a first percentage, F1, of the window size, the datagram size is increased 1285. Like the window size, the maximum datagram size may be determined by a number of factors.

However, the datagram size is typically limited by the network. For example, the internet protocol (IP) limits the datagram size to 64 kbytes. However, many network routers limit the datagram size to 16 kbytes. In an embodiment, the maximum datagram limit is set beneath both these values (e.g., at 8 kbytes). In addition to the factors discussed with respect to window size, the datagram size may be further limited by the server's declared datagram limit, as communicated in the most recently arrived reply message.

Note that after a flow increase, the flow timeout is reset to zero 1286. This is consistent with the discussion above concerning FIGS. 10a and 10b. That is, once the flow timeout falls beneath the flow timeout threshold, the flow is increased and the flow timeout is reset to zero so that future flow increases may occur only after a sufficient delay. Once the flow timeout is reset 1286 to zero, the datagram size is again checked 1287 to see if it is below a second percentage, F2, of the window size. If so, and if the datagram size is less than its maximum allowable size, the datagram size is increased 1289. Otherwise the client waits for the next event.

In an embodiment, the first percentage F1 is greater than the second percentage F2. For example, in a further embodiment, the first percentage F1 is large (e.g., above 10% such as 33%) while the second percentage F2 is small (e.g., below 10% such as 6.25%). By the methodology of FIG. 12, whenever the datagram size is well below the window size (e.g., only 6.25% of the window size or less), the datagram size is increased (provided it is less than its maximum allowable value) regardless of whether the window size or datagram size has or has not been previously increased. The amount that the datagram is increased may vary by embodiment. In one embodiment, both increases 1285, 1289 correspond to a doubling of the size.

c) Flow Decrease

Referring back to FIG. 7, recall that an inquiry 732 is made as to whether or not the flow should be decreased in light of a declaration that a requested portion of the response has become lost. If it is decided that the flow should be decreased, such action is taken 733. Otherwise, the client waits for the next event.

Figure 13:
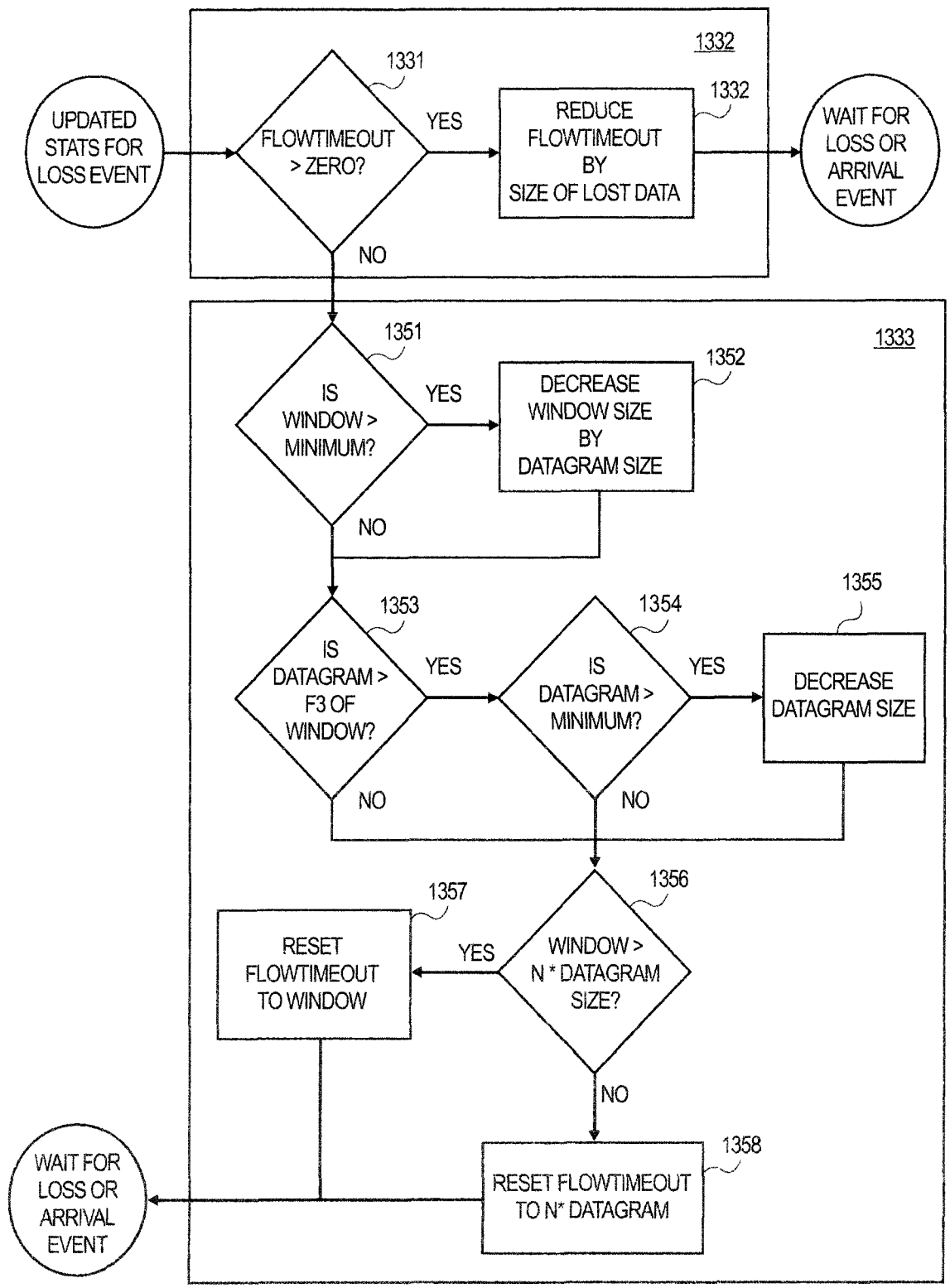
FIG. 13 shows an embodiment of a method for determining whether a flow decrease is desirable and for reducing a flow.

FIG. 13 shows a possible embodiment 1332 for methodology 732 of FIG. 7 and a possible embodiment 1333 for methodology 733 of FIG. 7. The methodologies 1332, 1333 operate consistently with the approach of FIG. 10b wherein flow adjustments are determined based upon the position of the flow timeout pointer 1002. As discussed in more detail below, the particular embodiment of FIG. 13 permits flow reduction only when flow timeout is zero or less and resets the flow timeout to a positive value after a reduction.

Since a flow decrease causes the flow timeout to be set above zero, preventing a flow decrease while the flow timeout is positive causes a delay before another flow decrease will be permitted. Additionally, referring back to 1123 of FIG. 11, resetting the flow timeout to a positive value increases the delay until a flow increase may be permitted. That is, by increasing the flow timeout to a positive value, a larger amount of response data will have to be received or declared lost before the flow timeout reaches the flow timeout threshold.

Thus, according to the methodology of FIGS. 11 and 13, a flow reduction causes a temporary suspension of further flow control adjustments, both up and down. This has the effect of letting the transaction ride out transient clusters of network loss without making dramatic changes that could destabilize the network. Once the flow timeout reaches zero, further loss, which may be indicative of sustained congestion, may trigger further reduction as per the methodology 1333 of FIG. 13. In the absence of further loss, increases may resume as per the methodology of FIG. 11.

As seen in the methodology 1332 of FIG. 13, if the flow timeout parameter is greater than zero, no increase is allowed and the flow timeout is reduced 1360 by the amount of response data that was declared lost. If the flow timeout is less than zero, a flow decrease is entertained and a methodology 1333 is executed. A first inquiry 1351 of this flow decrease methodology asks whether or not the current window size is greater than its minimum allowable window size. In an embodiment, the minimum window size is equal to the current datagram size as a matter of convenience. Determination of the smallest datagram size, and therefore the absolute minimum window size, is discussed later.

If the window size is greater than its allowable minimum, the window size is decreased 1352. The amount that the window size is decreased 1352 may vary from embodiment to embodiment (e.g., by a fixed amount or by a fixed percentage of the window size). Note that in the particular embodiment of FIG. 13, the window size is decreased by the size of the current datagram size setting.

After the window size is decreased 1352 an inquiry 1353 is made into the size of datagrams. If the datagram size is greater than a percentage F3 of the present window size, the datagram size is decreased 1355 provided that it is presently greater than the minimum allowable datagram size 1354. If the datagram size is not greater than F3 of the present window size, the datagram size is not decreased. F3 is typically a large percentage (e.g., greater than 10%).

The minimum datagram size may vary by embodiment. In various embodiments, a minimum is enforced because as datagram size decreases, the proportion of resources consumed by processing and network overhead begin to outweigh any performance benefit which might result from the reduction. In an embodiment, the minimum datagram size limit is set at 512 bytes. As discussed above, the minimum window size in an embodiment is equal to this smallest datagram size. It should be noted that the datagram size discussed here is the maximum that the server is allowed to use for its reply messages. It is possible that the server may send smaller datagrams, however the client will not require it to do so.

The flow decrease process 1333 of FIG. 13 is similar to the flow increase procedure 1224 of FIG. 12 in that the adjustments to the window size are emphasized. That is, the flow increase procedure 1224 of FIG. 12 increases the window size until it reaches its maximum allowable size 1281. After the maximum allowable window size is reached, the flow is increased by increasing the datagram size. Similarly, the flow decrease procedure 1333 of FIG. 13 decreases the window size until it reaches its minimum allowable size 1351. After the minimum allowable window size is reached, the flow is decreased by decreasing the datagram size. In an embodiment where the window size minimum is governed by the datagram size, reducing the datagram size may permit the window size to be reduced later, should another reduction in flow be required.

In either procedures 1232, 1333 the window size and datagram size may be simultaneously adjusted. In the case of a flow increase, the datagram size may be increased along with the window size if the window size is beneath its maximum allowable value and the datagram size is less than a small percentage F2 (e.g., below 10%) of the window size. In the case of a flow decrease, the datagram size may be decreased along with the window size if the window size is above its minimum allowable value and the datagram size is greater than a large percentage F3 (e.g., above 10% such as 25%) of the window size.

Recall that the flow timeout will be reset to a value greater than zero if a flow decrease is implemented. Methods 1356, 1357 and 1358 are devoted to resetting the flow timeout value above zero. In an embodiment, the flow timeout will be set to a positive value equal to the current window size. However if the window size has dropped below N minimum datagrams worth of data, then flow timeout will be set to N times that minimum datagram size. In an embodiment N is greater than 1.00 and may be an integer (e.g., 3). In other embodiments, the flow timeout may be set to some other positive value in accordance with current observations of network and client performance.

In the methodology illustrated by FIG. 13, the flow timeout reset level is proportional to the current window size. Thus a single network anomaly, which may cause the loss of all data currently in transit, will result in only one flow reduction. Continued loss beyond the data currently in transit may be indicative of chronic congestion, and thus warrants further reductions once the flow timeout falls to zero or less. The minimum reset level of N times the minimum datagram size ensures that extra caution is used during extreme congestion.

Note that in the methodology illustrated by FIG. 8, the flow parameters may only be lowered 832, 833 in response to a loss detection 812. Alternative embodiments may choose to invoke the lowering mechanisms of 832 and 833 in response to other events which indicate a performance problem. One example would be if an examination of the performance statistics as for 921 of FIG. 9 revealed performance to be very far below acceptable levels. Another case where an embodiment might invoke the lowering mechanisms of 832 and 833 would be where the client application indicates a desire to reduce the resources consumed by the transaction. Likewise, a direct indication from one or more routers along the data path that critical congestion exists could be used to trigger the lowering mechanism. The mechanism of invoking the lowering mechanisms 832, 833 in response to indications other than loss is called "preemptive lowering" and its use may vary by embodiment.

d) Flow Statistics

Referring back to FIG. 7, recall that performance statistics are updated 721, 731 upon the receipt of a reply message or the declaration that a reply message has been lost. Also, recall that a parameter referred to as the repeat interval is used to determine whether or not requested response data has been declared lost. That is, a loss declaration is made if a requested portion of the response has not yet been received and an amount of time equal to the repeat interval passes after the request for that portion is made.

Figure 14:
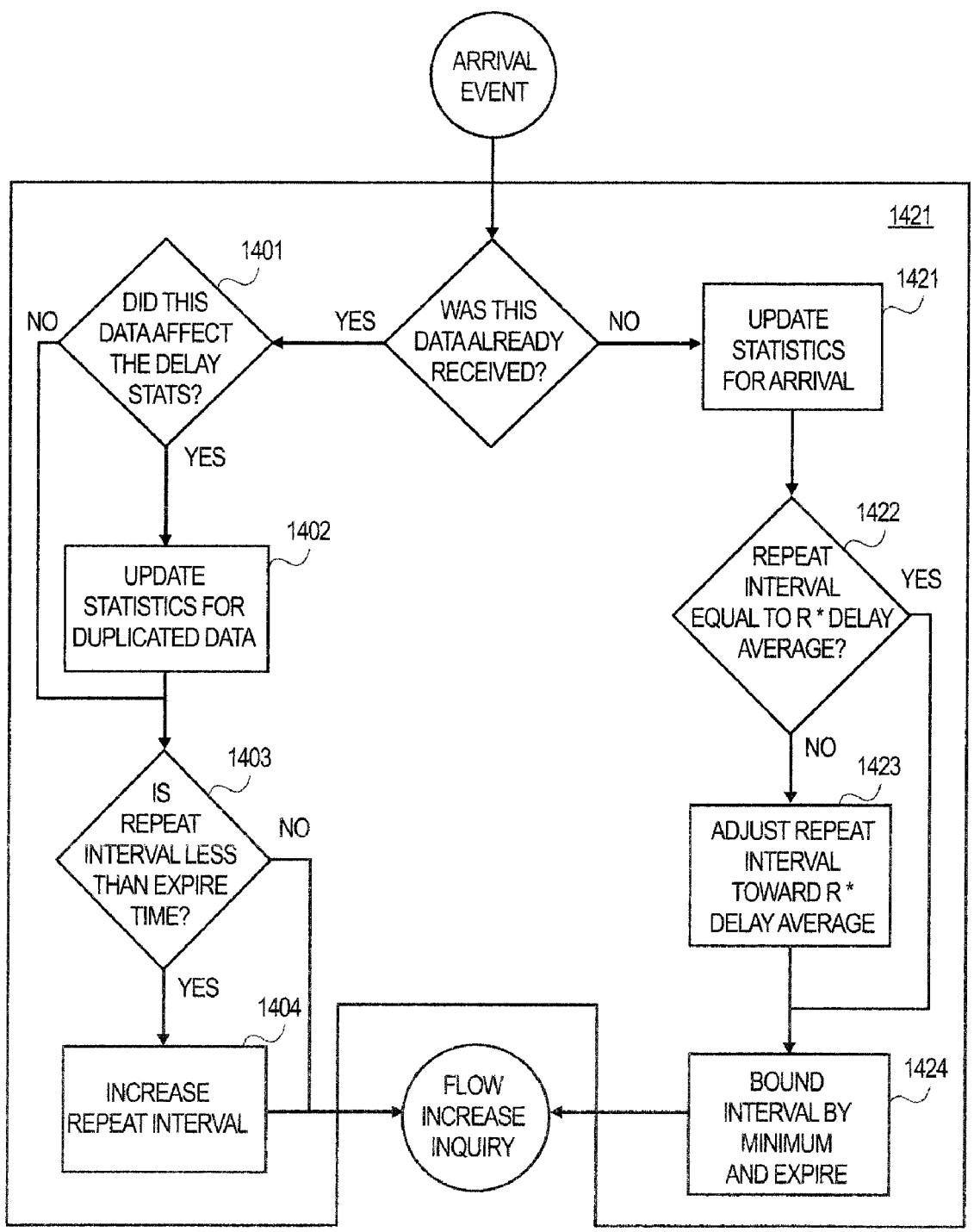
FIG. 14 shows an embodiment for determining a repeat interval used to time whether or not a requested data is declared lost.

FIG. 14 shows an embodiment 1421 of the flow statistics update methodology 721 of FIG. 7 used for updating statistics upon the arrival of a reply message. Note that the embodiment 1421 also incorporates a methodology for calculating the repeat interval.

It is possible that the declaration that a portion of the response has been lost may be inaccurate. That is, rather than being actually lost, the portion of the response may be significantly delayed. Thus, it is possible that a reply message will arrive at the client carrying a portion of the response already declared lost (e.g., because the propagation delay experienced by the reply message through the network exceeded the repeat interval). Furthermore, it is possible that a second request message may have already been sent for the portion of the data declared lost. Thus it is possible that the client will receive a second reply message for the same portion of the response.

In the methodology of FIG. 14, an inquiry is made as to whether the data contained in the reply message has already been received. If the reply message is the first reply message received for the portion of the response it carries, the methodology follows the path on the right as seen in FIG. 14. If the reply message is duplicating data already received in a previous reply message, the methodology follows the path on the left as seen in FIG. 14.

Along the path on the right, the performance statistics are updated 1421*a*. In this embodiment, the performance statistics calculate an average delay (which is a parameter that was discussed above). The current repeat interval is then compared to the newly updated average delay. If the repeat interval is equal to a factor of R times the average delay, it checked 1424 against an upper bound and a lower bound to ensure that it is within acceptable limits. The repeat interval may be bounded above by the expiration time of the transaction. The repeat interval may be bounded below by a minimum time needed to promote network stability. Both bounds may be influenced by statistics from recent or concurrent transactions, client application or operating system preferences, hardware configuration, or other factors. The repeat interval is reset to be between these bounds if it is currently outside them. Note that if the repeat interval is not equal to R*Delay it is moved some amount closer to R*Delay (e.g. halfway).

R is greater than 1.00 and may be an integer (e.g., 3). Setting the repeat interval greater than the average delay prevents those reply messages that are only slightly delayed from being declared lost. Embodiments may choose a constant value for R or they may calculate R based upon recent transaction statistics, such as the standard deviation of delay times.

Along the pathway on the left as seen in FIG. 14, an inquiry 1401 is made to see if the first reply message received for the duplicated data contributed to the delay statistics such as the minimum and average. If so, it is possible that those statistics have been corrupted by the erroneous loss declaration. A record is therefore kept of how previous arrivals have affected the statistics and this record is checked to see if the duplicated response message has influenced any of them. If it has, then the statistics are recomputed using uncorrupted data.

The existence of duplicate data suggests that a reply message was declared lost when it was merely delayed by a time greater than the repeat interval. Once the duplicated response message has been removed from the delay statistics (if necessary), the repeat interval is examined to see if it can be increased. Provided that the repeat interval is within its upper bound, as discussed above, it will be increased to allow more time for delayed reply messages to arrive. The increase may be a set amount, an calculated amount based on statistics from this and other transactions, or a fixed percentage of the current repeat interval (e.g. 25%).

4.0 Single and Dynamic Data Flows a) Overview

Recall from the data flow discussion concerning FIG. 3 that, under typical operation, a request message 309 is sent from the client 301 to the server 302 that requests a specific portion (e.g., via an initial address and an extent) of the response 308. Furthermore, the server 302 typically indicates the size of the response 308 in the reply messages 313 sent in reply to the request message so that the client understands how much data it should request in order to complete the transaction.

The following discussion concerns deviations from the normal mode of operation discussed above. The first deviation, referred to as "Single" mode, applies if the entire response 306 is to be sent in a single reply message 313. The second deviation, referred to as "Dynamic", applies if the server is unable to understand the complete size of the response 308. Both of these modes are discussed in succession immediately below.

b) "Single"

In the "single" embodiment, a single reply message is used to send the entire response 308. As a result, a single request message 309 and a single reply message 313 completes the transaction. The single embodiment can be used if the client application 305 understands that the response 308 is going to be small. As such, the client application 305 can include in its request 306 to the client transport layer 307 an indication that "single" mode is to be used.

In response, the client transport layer 307 sends in its initial request message 309 to the server 302 an indication that only one reply message 313 is to be sent. For example, in an embodiment, the request message 309 includes a bit corresponding to a "single flag". If the bit is set, the server 302 understands that "single" mode is to be used for this transaction.

When "single" mode is in effect, the extent parameter (that typically defines the size of a requested portion of the response) is effectively disabled. The flow control mechanisms discussed above may also abandoned, as well as the starting address and object identifier fields associated with the request message header 315. The "single" mode may be viewed as a special optimization that may be used by client application 305 writers to maintain a high degree of control over particular transactions.

c) "Dynamic"

The "dynamic" mode applies if the server 302 does not know how large the response 308 will be. Examples include Common Gateway Interface (CGI) programs which generate response data in real-time. Because the several application may not know how much data the CGI program will generate, it cannot supply an indication of the response size to the client transport layer.

For dynamic transactions, the server transport layer 310 may inform the client transport layer 307 (e.g., in the header of one or more reply messages 313 that respond to a request message for the dynamic information): 1) that the server 302 does not know the size of the response 308; and 2) of the size of a buffer that the server 302 will use to queue the response data before being forwarded to the client 301 in a reply message.

Upon receipt of such a reply message, the client transport layer 307 limits the absolute span of the non contiguous window to the size of the buffer used by the server 302. The absolute span of a non contiguous window is the span from the earliest "in transit" data to the latest "in transit" data. For example, referring to FIG. 6 at time T2, the absolute span of the non contiguous window corresponds to the distance between the left edge of portion 610 and the right edge of portion 611.

By limiting the absolute span of the non contiguous window to the size of a buffer used by the server to queue dynamic response data, if data is deemed lost, the lost data will still be buffered at the server 302. As a result, it can be re-requested and quickly retrieved because of its buffered location. Because the server 302 knows that the client has limited the absolute span of the non contiguous window to the size of the server's buffer, any request messages received from the client for data beyond the server's latest (i.e., most recent) buffered contents correspond to an implied indication by the client that the client has successfully received an equal amount of the server's earliest (i.e., oldest) buffer contents. As a result, the newly requested amount can coextensively replace (within the server's buffer) this earliest portion of the buffer's contents.

When the end of the dynamic transaction arises, the server application 311 sends an indication to the client (e.g., via a flag or field in a reply message header). Note that, in an embodiment, the indication may correspond to a message that "'X' bytes remain in the dynamic before it ends". As such, the client transport layer will understand how much of the response 308 remains and can therefore issue subsequent request messages appropriately. Once the last of the response 308 data has been received at the client, the client can indicate to the server that the transaction has been successfully completed.

5.0 Additional Comments

It is to be understood that embodiments of this invention may be used as or to support software programs executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   receiving at a client transport layer a request from a client application;
   at said client transport layer, controlling the flow of information corresponding to a client's reception of said request's response, said controlling comprising:

sending a request for a first contiguous portion of said response;

receiving a first section of said first contiguous portion;

not receiving a second section of said first contiguous portion;

receiving a third section of said first contiguous portion, where, said first section precedes said second section and said second section precedes said third section in said first contiguous portion's sequence order;

sending a request for a second contiguous portion of said response, said second contiguous portion corresponding to a next contiguous portion of said response immediately following said first contiguous portion in said response's sequence order, said second contiguous portion having a size corresponding to said first contiguous portion's size less said second section's size; and, continuously requesting and receiving, while said second section remains not received and said client remains waiting to receive said second section, subsequent contiguous portions of said response in order of said response's sequence order such that a window of said second contiguous portion's size effectively slides without limit toward the end of said response.

2. The method of claim 1 wherein said requests are sent to a server.

3. The method of claim 1 further comprising a size of said requested first contiguous portion of said response being determined by said client in view of networking traffic flow conditions monitored by said client.

4. The method of claim 1 wherein said request from said client application to said client transport layer is for a data object held by a server that provides said response.

5. The method of claim 4 wherein said client application provides an IP address to said client transport layer, said IP address corresponding to said server's IP address.

6. The method of claim 1 wherein said request from said client application to said client transport layer is for a server to take an action on a data object, said response corresponding to a result of said action.

7. A machine readable storage medium having program code as opposed to transitory electromagnetic signals stored thereon that when processed by a computer cause the computer to perform a method, the method comprising:

receiving at a client transport layer a request from a client application;

at said client transport layer, controlling the flow of information corresponding to a client's reception of said request's response, said controlling comprising:

sending a request for a first contiguous portion of said response;

receiving a first section of said first contiguous portion;

not receiving a second section of said first contiguous portion;

receiving a third section of said first contiguous portion, where, said first section precedes said second section and said second section precedes said third section in said first contiguous portion's sequence order;

sending a request for a second contiguous portion of said response, said second contiguous portion corresponding to a next contiguous portion of said response immediately following said first contiguous portion in said response's sequence order, said second contiguous portion having a size corresponding to said first contiguous portion's size less said second section's size; and, continuously requesting and receiving, while said second section remains not received and said client remains waiting to receive said second section, subsequent contiguous portions of said response in order of said response's sequence order such that a window of said second contiguous portion's size effectively slides without limit toward the end of said response.

8. The machine readable storage medium of claim 7 wherein said requests are sent to a server.

9. The machine readable storage medium of claim 7 wherein said method further comprises a size of said requested first contiguous portion of said response being determined by said client in view of networking traffic flow conditions monitored by said client.

10. The machine readable storage medium of claim 7 wherein said request from said client application to said client transport layer is for a data object held by a server that provides said response.

11. The machine readable storage medium of claim 10 wherein said client application provides an IP address to said client transport layer, said IP address corresponding to said server's IP address.

12. The machine readable storage medium of claim 7 wherein said request from said client application to said client transport layer is for a server to take an action on a data object, said response corresponding to a result of said action.

13. A computer having a readable storage medium containing program code that when read from said storage medium and processed by said computer causes said computer to perform a method, comprising:

receiving at a client transport layer a request from a client application;

at said client transport layer, controlling the flow of information corresponding to a client's reception of said request's response, said controlling comprising:

sending a request for a first contiguous portion of said response;

receiving a first section of said first contiguous portion;

not receiving a second section of said first contiguous portion;

receiving a third section of said first contiguous portion, where, said first section precedes said second section and said second section precedes said third section in said first contiguous portion's sequence order;

sending a request for a second contiguous portion of said response, said second contiguous portion corresponding to a next contiguous portion of said response immediately following said first contiguous portion in said response's sequence order, said second contiguous portion having a size corresponding to said first contiguous portion's size less said second section's size; and, continuously requesting and receiving, while said second section remains not received and said client remains waiting to receive said second section, subsequent contiguous portions of said response in order of said response's sequence order such that a window of said second contiguous portion's size effectively slides without limit toward the end of said response.

14. The machine readable storage medium of claim 13 wherein said requests are sent to a server.

15. The machine readable storage medium of claim 13 wherein said method further comprises a size of said requested first contiguous portion of said response being determined by said client in view of networking traffic flow conditions monitored by said client.

16. The machine readable storage medium of claim 13 wherein said request from said client application to said client transport layer is for a data object held by a server that provides said response.

17. The machine readable storage medium of claim 16 wherein said client application provides an IP address to said client transport layer, said IP address corresponding to said server's IP address.

18. The machine readable storage medium of claim 13 wherein said request from said client application to said client transport layer is for a server to take an action on a data object, said response corresponding to a result of said action.

* * * * *